(12) United States Patent
Kolavennu et al.

(10) Patent No.: US 11,626,004 B2
(45) Date of Patent: *Apr. 11, 2023

(54) METHODS AND SYSTEMS FOR IMPROVING INFECTION CONTROL IN A FACILITY

(71) Applicant: Honeywell International Inc., Charlotte, NC (US)

(72) Inventors: Soumitri Kolavennu, Blaine, MN (US); Ramdas Pai, Cary, NC (US); Arun Vijayakumari Mahasenan, Plymouth, MN (US); Aravind Padmanabhan, Plymouth, MN (US); Rongbao Nie, Shanghai (CN)

(73) Assignee: HONEYWELL INTERNATIONAL, INC., Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/696,129

(22) Filed: Mar. 16, 2022

(65) Prior Publication Data

US 2022/0207985 A1    Jun. 30, 2022

Related U.S. Application Data

(63) Continuation of application No. 16/561,709, filed on Sep. 5, 2019, now Pat. No. 11,288,945.

(Continued)

(51) Int. Cl.
*G08B 21/24* (2006.01)
*G08B 21/04* (2006.01)
*G06V 40/20* (2022.01)

(52) U.S. Cl.
CPC ............ *G08B 21/245* (2013.01); *G06V 40/28* (2022.01); *G08B 21/0438* (2013.01)

(58) Field of Classification Search
CPC .............. G08B 21/245; G08B 21/0438; G08B 29/188; G06V 40/28; G06K 9/00355; G06Q 30/01
See application file for complete search history.

(56) References Cited

U.S. PATENT DOCUMENTS

| 191,512 A | 6/1877 | Bennett et al. |
|---|---|---|
| 4,009,647 A | 3/1977 | Howorth |

(Continued)

FOREIGN PATENT DOCUMENTS

| CA | 2387100 A1 | 11/2003 |
|---|---|---|
| CA | 2538139 A1 | 3/2005 |

(Continued)

OTHER PUBLICATIONS

Olken et al., "Object Lessons Learned from a Distributed System for Remote Building Monitoring and Operation," ACM SIGPLAN Notices, vol. 33, No. 10, pp. 284-295, Oct. 1998.

(Continued)

*Primary Examiner* — An T Nguyen
(74) *Attorney, Agent, or Firm* — Seager, Tufte & Wickhem, LLP

(57) ABSTRACT

Methods and systems for monitoring procedural compliance of staff in a facility. A system may include a plurality of sensors positioned adjacent a hand washing station. Each of the plurality of sensors may be configured to provide a corresponding sensor output signal that is indicative of whether a person is washing their hands at the hand washing station or not. A controller may be configured to fuse the sensor output signals from each of two or more of the plurality of sensors and to determine using the fused sensor output signals whether the person has washed their hands at the hand washing station in compliance with one or more predetermined criteria or not. The controller may be further configured to output a notification when the controller has (Continued)

determined that the person has washed their hands at the hand washing station in compliance with the one or more predetermined criteria.

20 Claims, 5 Drawing Sheets

Related U.S. Application Data

(60) Provisional application No. 62/727,480, filed on Sep. 5, 2018.

(56) References Cited

U.S. PATENT DOCUMENTS

| | | | |
|---|---|---|---|
| 4,375,637 A | 3/1983 | Desjardins | |
| 4,918,615 A | 4/1990 | Suzuki et al. | |
| 4,939,922 A | 7/1990 | Smalley et al. | |
| 5,566,084 A | 10/1996 | Cmar | |
| 5,727,579 A | 3/1998 | Chardack | |
| 5,745,126 A | 4/1998 | Jain et al. | |
| 5,751,916 A | 5/1998 | Kon et al. | |
| 5,777,598 A | 7/1998 | Gowda et al. | |
| 5,973,662 A | 10/1999 | Singers et al. | |
| 6,065,842 A | 5/2000 | Fink | |
| 6,139,177 A | 10/2000 | Venkatraman et al. | |
| 6,144,993 A | 11/2000 | Fukunaga et al. | |
| 6,157,943 A | 12/2000 | Meyer | |
| 6,229,429 B1 | 5/2001 | Horon | |
| 6,238,337 B1 | 5/2001 | Kambhatla et al. | |
| 6,334,211 B1 | 12/2001 | Kojima et al. | |
| 6,353,853 B1 | 3/2002 | Gravlin | |
| 6,369,695 B2 | 4/2002 | Horan | |
| 6,375,038 B1 | 4/2002 | Daansen et al. | |
| 6,429,868 B1 | 8/2002 | Dehner, Jr. et al. | |
| 6,473,084 B1 | 10/2002 | Phillips et al. | |
| 6,487,457 B1 | 11/2002 | Hull et al. | |
| 6,580,950 B1 | 6/2003 | Johnson et al. | |
| 6,598,056 B1 | 7/2003 | Hull et al. | |
| 6,619,555 B2 | 9/2003 | Rosen | |
| 6,704,012 B1 | 3/2004 | Lefave | |
| 6,720,874 B2 | 4/2004 | Fufido et al. | |
| 6,727,818 B1 * | 4/2004 | Wildman | G16H 40/20 340/567 |
| 6,741,915 B2 | 5/2004 | Poth | |
| 6,796,896 B2 | 9/2004 | Laiti | |
| 6,801,199 B1 | 10/2004 | Wallman | |
| 6,816,878 B1 | 11/2004 | Zimmers et al. | |
| 6,876,951 B2 | 4/2005 | Skidmore et al. | |
| 6,882,278 B2 | 4/2005 | Winings et al. | |
| 6,904,385 B1 | 6/2005 | Budike, Jr. | |
| 6,907,387 B1 | 6/2005 | Reardon | |
| 6,911,177 B2 | 6/2005 | Deal | |
| 6,993,403 B1 | 1/2006 | Dadebo et al. | |
| 6,993,417 B2 | 1/2006 | Osann, Jr. | |
| 7,023,440 B1 | 4/2006 | Havekost et al. | |
| 7,031,880 B1 | 4/2006 | Seem et al. | |
| 7,062,722 B1 | 6/2006 | Carlin et al. | |
| 7,110,843 B2 | 9/2006 | Pagnano et al. | |
| 7,139,685 B2 | 11/2006 | Bascle et al. | |
| 7,164,972 B2 | 1/2007 | Imhof et al. | |
| 7,183,899 B2 | 2/2007 | Behnke | |
| 7,200,639 B1 | 4/2007 | Yoshida | |
| 7,222,111 B1 | 5/2007 | Budike, Jr. | |
| 7,222,800 B2 | 5/2007 | Wruck | |
| 7,257,397 B2 | 8/2007 | Shamoon et al. | |
| 7,280,030 B1 | 10/2007 | Monaco | |
| 7,292,908 B2 | 11/2007 | Borne et al. | |
| 7,295,116 B2 | 11/2007 | Kumar et al. | |
| 7,302,313 B2 | 11/2007 | Sharp et al. | |
| 7,308,323 B2 | 12/2007 | Kruk et al. | |
| 7,308,388 B2 | 12/2007 | Beverina et al. | |
| 7,313,447 B2 | 12/2007 | Hsiung et al. | |
| 7,346,433 B2 | 3/2008 | Budike, Jr. | |
| 7,356,548 B1 | 4/2008 | Culp et al. | |
| 7,379,782 B1 | 5/2008 | Cocco | |
| 7,383,148 B2 | 6/2008 | Ahmed | |
| 7,434,742 B2 | 10/2008 | Mueller et al. | |
| 7,447,333 B1 | 11/2008 | Masticola et al. | |
| 7,466,224 B2 | 12/2008 | Ward et al. | |
| 7,496,472 B2 | 2/2009 | Seem | |
| 7,512,450 B2 | 3/2009 | Ahmed | |
| 7,516,490 B2 | 4/2009 | Riordan et al. | |
| 7,548,833 B2 | 6/2009 | Ahmed | |
| 7,551,092 B1 | 6/2009 | Henry | |
| 7,557,729 B2 | 7/2009 | Hubbard et al. | |
| 7,567,844 B2 | 7/2009 | Thomas et al. | |
| 7,596,473 B2 | 9/2009 | Hansen et al. | |
| 7,610,910 B2 | 11/2009 | Ahmed | |
| 7,626,507 B2 | 12/2009 | LaCasse | |
| 7,664,574 B2 | 2/2010 | Imhof et al. | |
| 7,682,464 B2 | 3/2010 | Glenn et al. | |
| 7,702,421 B2 | 4/2010 | Sullivan et al. | |
| 7,729,882 B2 | 6/2010 | Seem | |
| 7,755,494 B2 | 7/2010 | Melker et al. | |
| 7,761,310 B2 | 7/2010 | Rodgers | |
| 7,774,227 B2 | 8/2010 | Srivastava | |
| 7,797,188 B2 | 9/2010 | Srivastava | |
| 7,819,136 B1 | 10/2010 | Eddy | |
| 7,822,806 B2 | 10/2010 | Frank et al. | |
| 7,856,370 B2 | 12/2010 | Katta et al. | |
| 7,978,083 B2 | 7/2011 | Melker et al. | |
| 7,984,384 B2 | 7/2011 | Chaudhri et al. | |
| 7,986,323 B2 | 7/2011 | Kobayashi et al. | |
| 8,024,666 B2 | 9/2011 | Thompson | |
| 8,086,047 B2 | 12/2011 | Penke et al. | |
| 8,099,178 B2 | 1/2012 | Mairs et al. | |
| 8,151,280 B2 | 4/2012 | Sather et al. | |
| 8,176,095 B2 | 5/2012 | Murray et al. | |
| 8,218,871 B2 | 7/2012 | Angell et al. | |
| 8,219,660 B2 | 7/2012 | McCoy et al. | |
| 8,271,941 B2 | 9/2012 | Zhang et al. | |
| 8,294,585 B2 | 10/2012 | Barnhill | |
| 8,302,020 B2 | 10/2012 | Louch et al. | |
| 8,320,634 B2 | 11/2012 | Deutsch | |
| 8,334,422 B2 | 12/2012 | Gutsol et al. | |
| 8,344,893 B1 | 1/2013 | Drammeh | |
| 8,375,118 B2 | 2/2013 | Hao et al. | |
| 8,476,590 B2 | 7/2013 | Stratmann et al. | |
| 8,516,016 B2 | 8/2013 | Park et al. | |
| 8,558,660 B2 | 10/2013 | Nix et al. | |
| 8,639,527 B2 | 1/2014 | Rensvold et al. | |
| 8,698,637 B2 | 4/2014 | Raichman | |
| 8,816,860 B2 | 8/2014 | Ophardt et al. | |
| 8,869,027 B2 | 10/2014 | Louch et al. | |
| 8,904,497 B2 | 12/2014 | Hsieh | |
| 8,936,944 B2 | 1/2015 | Peltz et al. | |
| 8,947,437 B2 | 2/2015 | Garr et al. | |
| 8,950,019 B2 | 2/2015 | Loberger et al. | |
| 9,000,926 B2 | 4/2015 | Hollock et al. | |
| 9,030,325 B2 | 5/2015 | Taneff | |
| 9,098,738 B2 | 8/2015 | Bilet et al. | |
| 9,105,071 B2 | 8/2015 | Fletcher et al. | |
| 9,175,356 B2 | 11/2015 | Peltz et al. | |
| 9,240,111 B2 | 1/2016 | Scott et al. | |
| 9,280,884 B1 | 3/2016 | Schultz et al. | |
| 9,292,972 B2 | 3/2016 | Hailemariam et al. | |
| 9,320,662 B2 | 4/2016 | Hayes et al. | |
| 9,370,600 B1 | 6/2016 | DuPuis et al. | |
| 9,373,242 B1 | 6/2016 | Conrad et al. | |
| 9,396,638 B2 | 7/2016 | Wildman et al. | |
| 9,311,807 B2 | 8/2016 | Schultz et al. | |
| 9,406,212 B2 | 8/2016 | De Luca et al. | |
| 9,418,535 B1 | 8/2016 | Felch et al. | |
| 9,418,536 B1 | 8/2016 | Felch et al. | |
| 9,449,219 B2 | 9/2016 | Bilet et al. | |
| 9,477,543 B2 | 10/2016 | Henley et al. | |
| 9,497,832 B2 | 11/2016 | Verberkt et al. | |
| 9,513,364 B2 | 12/2016 | Hall et al. | |
| 9,526,380 B2 | 12/2016 | Hamilton et al. | |
| 9,526,806 B2 | 12/2016 | Park et al. | |
| 9,536,415 B2 | 1/2017 | De Luca et al. | |
| 9,558,648 B2 | 1/2017 | Douglas | |
| 9,591,267 B2 | 3/2017 | Lipton et al. | |

(56) References Cited

U.S. PATENT DOCUMENTS

| | | | |
|---|---|---|---|
| 9,613,518 B2 | 4/2017 | Dunn et al. |
| 9,618,224 B2 | 4/2017 | Emmons et al. |
| 9,640,059 B2 | 5/2017 | Hyland |
| 9,672,360 B2 | 6/2017 | Barkan |
| 9,710,700 B2 | 7/2017 | Bilet et al. |
| 9,715,242 B2 | 7/2017 | Pillai et al. |
| 9,721,452 B2 | 8/2017 | Felch et al. |
| 9,729,945 B2 | 8/2017 | Schultz et al. |
| 9,784,464 B2 | 10/2017 | Yamamoto et al. |
| 9,843,743 B2 | 12/2017 | Lewis et al. |
| 9,856,634 B2 | 1/2018 | Rodenbeck et al. |
| 9,872,088 B2 | 1/2018 | Fadell et al. |
| 9,875,639 B2 | 1/2018 | Bone et al. |
| 9,911,312 B2 | 3/2018 | Wildman et al. |
| 9,940,819 B2 | 4/2018 | Ferniany |
| 9,940,826 B1 | 4/2018 | Divakara et al. |
| 9,956,306 B2 | 5/2018 | Brais et al. |
| 9,986,175 B2 | 5/2018 | Frank et al. |
| 10,087,608 B2 | 10/2018 | Dobizl et al. |
| 10,223,894 B2 | 3/2019 | Raichman |
| 10,228,837 B2 | 3/2019 | Hua et al. |
| 10,235,865 B2 | 3/2019 | Thyroff |
| 10,251,610 B2 | 4/2019 | Parthasarathy et al. |
| 10,303,843 B2 | 5/2019 | Bitran et al. |
| 10,332,382 B2 | 6/2019 | Thyroff |
| 10,514,817 B2 | 12/2019 | Hua et al. |
| 10,565,844 B2 | 2/2020 | Pourmohammad et al. |
| 10,602,474 B2 | 3/2020 | Goldstein |
| 10,607,147 B2 | 3/2020 | Raykov et al. |
| 2002/0111698 A1 | 8/2002 | Graziano et al. |
| 2002/0130868 A1 | 9/2002 | Smith |
| 2003/0028269 A1 | 2/2003 | Spriggs et al. |
| 2003/0030637 A1 | 2/2003 | Grinstein et al. |
| 2003/0046862 A1 | 3/2003 | Wolf et al. |
| 2003/0071814 A1 | 4/2003 | Jou et al. |
| 2003/0078677 A1 | 4/2003 | Hull et al. |
| 2003/0083957 A1 | 5/2003 | Olefson |
| 2003/0103075 A1 | 6/2003 | Rosselot |
| 2003/0171851 A1 | 9/2003 | Brickfield et al. |
| 2003/0214400 A1 | 11/2003 | Mizutani et al. |
| 2003/0233432 A1 | 12/2003 | Davis et al. |
| 2004/0001009 A1 | 1/2004 | Winings et al. |
| 2004/0064260 A1 | 4/2004 | Padmanabhan et al. |
| 2004/0143474 A1 | 7/2004 | Haeberle et al. |
| 2004/0153437 A1 | 8/2004 | Buchan |
| 2004/0168115 A1 | 8/2004 | Bauernschmidt et al. |
| 2004/0233192 A1 | 11/2004 | Hopper |
| 2004/0260411 A1 | 12/2004 | Cannon |
| 2005/0010460 A1 | 1/2005 | Mizoguchi et al. |
| 2005/0119767 A1 | 6/2005 | Kiwimagi et al. |
| 2005/0143863 A1 | 6/2005 | Ruane et al. |
| 2005/0267900 A1 | 12/2005 | Ahmed et al. |
| 2006/0004841 A1 | 1/2006 | Heikkonen et al. |
| 2006/0009862 A1 | 1/2006 | Imhof et al. |
| 2006/0017547 A1 | 1/2006 | Buckingham et al. |
| 2006/0020177 A1 | 1/2006 | Seo et al. |
| 2006/0028471 A1 | 2/2006 | Kincaid et al. |
| 2006/0029256 A1 | 2/2006 | Miyoshi et al. |
| 2006/0058900 A1 | 3/2006 | Johanson et al. |
| 2006/0067545 A1 | 3/2006 | Lewis et al. |
| 2006/0067546 A1 | 3/2006 | Lewis et al. |
| 2006/0077255 A1 | 4/2006 | Cheng |
| 2006/0184326 A1 | 8/2006 | McNally et al. |
| 2006/0231568 A1 | 10/2006 | Lynn et al. |
| 2006/0265664 A1 | 11/2006 | Simons et al. |
| 2006/0279630 A1 | 12/2006 | Aggarwal et al. |
| 2007/0016955 A1 | 1/2007 | Goldberg et al. |
| 2007/0055757 A1 | 3/2007 | Mairs et al. |
| 2007/0055760 A1 | 3/2007 | McCoy et al. |
| 2007/0061046 A1 | 3/2007 | Mairs et al. |
| 2007/0067062 A1 | 3/2007 | Mairs et al. |
| 2007/0088534 A1 | 4/2007 | MacArthur et al. |
| 2007/0090951 A1 | 4/2007 | Chan et al. |
| 2007/0091091 A1 | 4/2007 | Gardiner et al. |
| 2007/0101433 A1 | 5/2007 | Louch et al. |
| 2007/0114295 A1 | 5/2007 | Jenkins |
| 2007/0120652 A1 | 5/2007 | Behnke |
| 2007/0139208 A1 | 6/2007 | Kates |
| 2007/0216682 A1 | 9/2007 | Navratil et al. |
| 2007/0219645 A1 | 9/2007 | Thomas et al. |
| 2007/0239484 A1 | 10/2007 | Arond et al. |
| 2007/0268122 A1 | 11/2007 | Kow et al. |
| 2008/0001763 A1 | 1/2008 | Raja et al. |
| 2008/0027885 A1 | 1/2008 | Van Putten et al. |
| 2008/0036593 A1 | 2/2008 | Rose-Pehrsson et al. |
| 2008/0062167 A1 | 3/2008 | Boggs et al. |
| 2008/0099045 A1 | 5/2008 | Glenn et al. |
| 2008/0103798 A1 | 5/2008 | Domenikos et al. |
| 2008/0120396 A1 | 5/2008 | Jayaram et al. |
| 2008/0144885 A1 | 6/2008 | Zucherman et al. |
| 2008/0183424 A1 | 7/2008 | Seem |
| 2008/0194009 A1 | 8/2008 | Marentis |
| 2008/0198231 A1 | 8/2008 | Ozdemir et al. |
| 2008/0209342 A1 | 8/2008 | Taylor et al. |
| 2008/0222565 A1 | 9/2008 | Taylor et al. |
| 2008/0224862 A1 | 9/2008 | Cirker |
| 2008/0242945 A1 | 10/2008 | Gugliotti et al. |
| 2008/0250800 A1 | 10/2008 | Wetzel |
| 2008/0279420 A1 | 11/2008 | Masticola et al. |
| 2008/0280275 A1 | 11/2008 | Collopy |
| 2008/0303658 A1 | 12/2008 | Melker et al. |
| 2008/0306985 A1 | 12/2008 | Murray et al. |
| 2008/0320552 A1 | 12/2008 | Kumar et al. |
| 2009/0001181 A1 | 1/2009 | Siddaramanna et al. |
| 2009/0024944 A1 | 1/2009 | Louch et al. |
| 2009/0065596 A1 | 3/2009 | Seem et al. |
| 2009/0083120 A1 | 3/2009 | Strichman et al. |
| 2009/0096791 A1 | 4/2009 | Abshear et al. |
| 2009/0125337 A1 | 5/2009 | Abri |
| 2009/0125825 A1 | 5/2009 | Rye et al. |
| 2009/0144023 A1 | 6/2009 | Seem |
| 2009/0157744 A1 | 6/2009 | McConnell |
| 2009/0160673 A1 | 6/2009 | Cirker |
| 2009/0322782 A1 | 12/2009 | Kimchi et al. |
| 2010/0048167 A1 | 2/2010 | Chow et al. |
| 2010/0058248 A1 | 3/2010 | Park |
| 2010/0064001 A1 | 3/2010 | Daily |
| 2010/0070089 A1 | 3/2010 | Harrod et al. |
| 2010/0073162 A1 | 3/2010 | Johnson et al. |
| 2010/0123560 A1 | 5/2010 | Nix et al. |
| 2010/0134296 A1 | 6/2010 | Hwang |
| 2010/0156628 A1 | 6/2010 | Ainsbury et al. |
| 2010/0156630 A1 | 6/2010 | Ainsbury |
| 2010/0188228 A1 | 7/2010 | Hyland |
| 2010/0223198 A1 | 9/2010 | Noureldin et al. |
| 2010/0249955 A1 | 9/2010 | Sitton |
| 2010/0286937 A1 | 11/2010 | Hedley et al. |
| 2010/0315244 A1* | 12/2010 | Tokhtuev ............... G16H 40/20 340/603 |
| 2010/0318200 A1 | 12/2010 | Foslien et al. |
| 2010/0324962 A1 | 12/2010 | Nesler et al. |
| 2011/0010654 A1 | 1/2011 | Raymond et al. |
| 2011/0057799 A1 | 3/2011 | Taneff |
| 2011/0077779 A1 | 3/2011 | Fuller et al. |
| 2011/0083094 A1 | 4/2011 | Laycock et al. |
| 2011/0087988 A1 | 4/2011 | Ray et al. |
| 2011/0112854 A1 | 5/2011 | Koch et al. |
| 2011/0126111 A1 | 5/2011 | Gill et al. |
| 2011/0154426 A1 | 6/2011 | Doser et al. |
| 2011/0161124 A1 | 6/2011 | Lappinga et al. |
| 2011/0169646 A1 | 7/2011 | Raichman |
| 2011/0184563 A1 | 7/2011 | Foslien et al. |
| 2011/0202467 A1 | 8/2011 | Hilber et al. |
| 2011/0273298 A1 | 11/2011 | Snodgrass et al. |
| 2011/0291841 A1 | 12/2011 | Hollock et al. |
| 2011/0298301 A1 | 12/2011 | Wong et al. |
| 2011/0316703 A1 | 12/2011 | Butler et al. |
| 2011/0320054 A1 | 12/2011 | Brzezowski |
| 2012/0022700 A1 | 1/2012 | Drees et al. |
| 2012/0039503 A1 | 2/2012 | Chen et al. |
| 2012/0062382 A1 | 3/2012 | Taneff |
| 2012/0075464 A1 | 3/2012 | Derenne et al. |
| 2012/0109988 A1 | 5/2012 | Li et al. |
| 2012/0112883 A1 | 5/2012 | Wallace et al. |

(56) References Cited

U.S. PATENT DOCUMENTS

| | | |
|---|---|---|
| 2012/0131217 A1 | 5/2012 | Delorme et al. |
| 2012/0158185 A1 | 6/2012 | El-Mankabady et al. |
| 2012/0216243 A1 | 8/2012 | Gill et al. |
| 2012/0224057 A1 | 9/2012 | Gill et al. |
| 2012/0259466 A1 | 10/2012 | Ray et al. |
| 2012/0262472 A1 | 10/2012 | Garr et al. |
| 2012/0272146 A1 | 10/2012 | D'souza et al. |
| 2012/0291068 A1 | 11/2012 | Khushoo et al. |
| 2012/0303652 A1 | 11/2012 | Tseng |
| 2012/0310418 A1 | 12/2012 | Harrod et al. |
| 2013/0055132 A1 | 2/2013 | Foslien |
| 2013/0060794 A1 | 3/2013 | Puttabasappa et al. |
| 2013/0082842 A1 | 4/2013 | Balazs et al. |
| 2013/0086152 A1 | 4/2013 | Hersche et al. |
| 2013/0091631 A1 | 4/2013 | Hayes et al. |
| 2013/0110295 A1 | 5/2013 | Zheng et al. |
| 2013/0122807 A1 | 5/2013 | Tenarvitz et al. |
| 2013/0169681 A1 | 7/2013 | Rasane et al. |
| 2013/0184880 A1 | 7/2013 | McMahon |
| 2013/0187775 A1 | 7/2013 | Marsden et al. |
| 2013/0204570 A1 | 8/2013 | Mendelson et al. |
| 2013/0229276 A1 | 9/2013 | Hunter |
| 2013/0268293 A1 | 10/2013 | Knudson et al. |
| 2013/0289774 A1 | 10/2013 | Day et al. |
| 2013/0342349 A1* | 12/2013 | Cruz ............... G06Q 10/10 705/2 |
| 2014/0032157 A1 | 1/2014 | Khiani |
| 2014/0040998 A1 | 2/2014 | Hsieh |
| 2014/0046490 A1 | 2/2014 | Foslien et al. |
| 2014/0046722 A1 | 2/2014 | Rosenbloom et al. |
| 2014/0058539 A1 | 2/2014 | Park |
| 2014/0167917 A2 | 6/2014 | Wallace et al. |
| 2014/0207291 A1 | 7/2014 | Golden et al. |
| 2014/0292518 A1 | 10/2014 | Wildman et al. |
| 2014/0307076 A1 | 10/2014 | Deutsch |
| 2014/0309757 A1 | 10/2014 | Le Sant et al. |
| 2014/0316582 A1 | 10/2014 | Berg-Sonne et al. |
| 2014/0320289 A1 | 10/2014 | Raichman |
| 2014/0342724 A1 | 11/2014 | Hill et al. |
| 2014/0375457 A1 | 12/2014 | Diaz |
| 2015/0025329 A1 | 1/2015 | Amarasingham et al. |
| 2015/0032264 A1 | 1/2015 | Emmons et al. |
| 2015/0056909 A1 | 2/2015 | Chien |
| 2015/0070174 A1 | 3/2015 | Douglas |
| 2015/0077258 A1 | 3/2015 | Nelson et al. |
| 2015/0113462 A1 | 4/2015 | Chen et al. |
| 2015/0153918 A1 | 6/2015 | Chen et al. |
| 2015/0161874 A1 | 6/2015 | Thyroff et al. |
| 2015/0167995 A1 | 6/2015 | Fadell et al. |
| 2015/0168949 A1 | 6/2015 | Hua et al. |
| 2015/0194043 A1 | 7/2015 | Dunn et al. |
| 2015/0198707 A1 | 7/2015 | Al-Alusi |
| 2015/0212717 A1 | 7/2015 | Nair et al. |
| 2015/0213222 A1 | 7/2015 | Amarasingham et al. |
| 2015/0213379 A1 | 7/2015 | Nair et al. |
| 2015/0216369 A1 | 8/2015 | Hamilton et al. |
| 2015/0253748 A1 | 9/2015 | Brun et al. |
| 2015/0281287 A1 | 10/2015 | Gill et al. |
| 2016/0061476 A1 | 3/2016 | Schultz et al. |
| 2016/0061477 A1 | 3/2016 | Schultz et al. |
| 2016/0061794 A1 | 3/2016 | Schultz et al. |
| 2016/0061795 A1 | 3/2016 | Schultz et al. |
| 2016/0063833 A1 | 3/2016 | Schultz et al. |
| 2016/0066067 A1 | 3/2016 | Schultz et al. |
| 2016/0116181 A1 | 4/2016 | Aultman et al. |
| 2016/0139067 A1 | 5/2016 | Grace |
| 2016/0140831 A1 | 5/2016 | Hermann et al. |
| 2016/0253897 A1 | 9/2016 | Wildman et al. |
| 2016/0255516 A1 | 9/2016 | Hill et al. |
| 2016/0298864 A1 | 10/2016 | Ekolind et al. |
| 2016/0306934 A1 | 10/2016 | Sperry et al. |
| 2016/0314683 A1 | 10/2016 | Felch et al. |
| 2016/0328948 A1 | 11/2016 | Ferniany |
| 2016/0335731 A1 | 11/2016 | Hall |
| 2016/0367925 A1 | 12/2016 | Blackley |
| 2017/0024986 A1 | 1/2017 | Austin |
| 2017/0193792 A1 | 7/2017 | Bermudez Rodriguez et al. |
| 2017/0256155 A1 | 9/2017 | Sengstaken, Jr. |
| 2017/0280949 A1 | 10/2017 | Wildman et al. |
| 2017/0294106 A1 | 10/2017 | Thyroff |
| 2017/0365024 A1 | 12/2017 | Koch et al. |
| 2018/0016773 A1 | 1/2018 | Chandler et al. |
| 2018/0047277 A1 | 2/2018 | Thyroff |
| 2018/0151054 A1 | 5/2018 | Pi |
| 2018/0218591 A1 | 8/2018 | Easter |
| 2018/0293038 A1 | 10/2018 | Meruva et al. |
| 2018/0293873 A1 | 10/2018 | Liu et al. |
| 2018/0301014 A1 | 10/2018 | Worral et al. |
| 2018/0313695 A1 | 11/2018 | Shim et al. |
| 2018/0365957 A1 | 12/2018 | Wright et al. |
| 2019/0051138 A1 | 2/2019 | Easter |
| 2019/0139395 A1 | 5/2019 | Rogachev et al. |
| 2019/0209719 A1 | 7/2019 | Andersen et al. |
| 2020/0009280 A1 | 1/2020 | Kupa et al. |
| 2020/0074836 A1 | 3/2020 | Kolavennu et al. |
| 2020/0090089 A1 | 3/2020 | Aston et al. |
| 2020/0146557 A1 | 5/2020 | Cheung et al. |
| 2020/0200420 A1 | 6/2020 | Nayak et al. |
| 2020/0388193 A1* | 12/2020 | Trapani ............... G09B 19/0076 |
| 2021/0027882 A1 | 1/2021 | Wellig |

FOREIGN PATENT DOCUMENTS

| | | |
|---|---|---|
| CN | 103110410 A | 5/2013 |
| CN | 103970977 A | 8/2014 |
| CN | 105116848 A | 12/2015 |
| CN | 108961714 A | 12/2018 |
| CN | 110009245 A | 7/2019 |
| CN | 110084928 A | 8/2019 |
| CN | 110827457 A | 2/2020 |
| EP | 1669912 A1 | 6/2006 |
| EP | 2310981 A1 | 4/2011 |
| JP | 7085166 A | 3/1995 |
| JP | 11024735 A | 1/1999 |
| JP | 11317936 A | 11/1999 |
| JP | 2001356813 A | 12/2001 |
| JP | 2005242531 A | 9/2005 |
| JP | 2005311563 A | 11/2005 |
| KR | 1172747 B1 | 8/2012 |
| KR | 101445367 B1 | 10/2014 |
| KR | 1499081 B1 | 3/2015 |
| WO | 9621264 A3 | 11/1996 |
| WO | 2004029518 A1 | 4/2004 |
| WO | 2005045715 A2 | 5/2005 |
| WO | 2008152433 A1 | 12/2008 |
| WO | 2008157755 A1 | 12/2008 |
| WO | 2009012319 A2 | 1/2009 |
| WO | 2009079648 A1 | 6/2009 |
| WO | 2010106474 A1 | 9/2010 |
| WO | 2011025085 A1 | 3/2011 |
| WO | 2011043732 A1 | 4/2011 |
| WO | 2011057173 A2 | 5/2011 |
| WO | 2011123743 A1 | 10/2011 |
| WO | 2013062725 A1 | 5/2013 |
| WO | 2013178819 A1 | 12/2013 |
| WO | 2014009291 A1 | 1/2014 |
| WO | 2014098861 A1 | 6/2014 |
| WO | 2014135517 A1 | 9/2014 |
| WO | 2016123536 A1 | 8/2016 |
| WO | 2017057274 A1 | 4/2017 |
| WO | 2019046580 A1 | 3/2019 |
| WO | 2020024553 A1 | 2/2020 |

OTHER PUBLICATIONS

Proliphix, Inc., "Proliphix IP Devices: HTTP API," 28 pages, Jan. 23, 2006.
Proliphix, Inc., "Remote Management User Guide," 12 pages, prior to Aug. 27, 2007.
Rogan et al., "Smart and Final Food Stores: A Case Study in Web Based Energy Information and Collection," Web Based Energy Information and Control Systems: Case Studies and Application, Chapter 6, p. 59-64, 2005.

(56) References Cited

OTHER PUBLICATIONS

Sharp, "Actius AL3DU 3D LC Display High Performance 3D Visualization," 2 pages, prior to Mar. 17, 2006.
So et al., "Building Automation on the Information Superhighway," ASHRAE Transactions, vol. 104, Part 2, pp. 176-191, 1998.
So et al., "Building Automation Systems on the Internet," Facilities vol. 15, No. 5/6, pp. 125-133, May/Jun. 1997.
Talon, "Raptor Controller," 6 pages, Oct. 2003.
Talon, "Workstation Software," 4 pages, Nov. 2002.
Trane, "System Programming, Tracer Summit Version 14, BMTW-SVP01D-EN," 623 pages, 2002.
Lucid Design Group, Inc., "Building Dashboard," 2 pages, Printed May 30, 2013.
"America's Largest Managed Security Services Provider Launches Comprehensive, Integrated Covid-19 Safety Program for Office Buildings and Suites," KastleSafeSpaces, 5 pages, May 11, 2020.
"Biometric Door Reader With Body Temperature Detection," Kintronics, 9 pages, accessed May 21, 2020.
"Body Surface Temperature Screening with Alarm Function TVS-200IS/TVS-500IS," Nippon Avionics Co., 3 pages, accessed May 21, 2020.
"BriefCam announces video analytics innovation for contact tracing, physical distancing, occupancy management and face mask detection," BriefCam LTD, 11 pages, Jun. 5, 2020.
"Thermal Imaging SmartPhone Can Be used For Temperature Screening of People," CAT, 3 pages, accessed Jul. 13, 2020.
"Contact Tracing Now Available on Identiv's Hirsch Velocity Access Control Platform," Identiv, 5 pages, May 21, 2020.
Silva et al., "Cough localization for the detection of respiratory diseases in pig houses," ScienceDirect, 7 pages, May 28, 2008.
Oey et al., "Evaluation of Isolation Compliance Using Real Time Video In Critical Care," North Shore University Hospital, 1 page, Oct. 9, 2015.
"Facial Attendace System With Temperature Screening Now In India," IANS, 5 pages, Mar. 19, 2020.
"Plan to Re-Open," Ehigh, 16 pages, accessed Jun. 13, 2020.
"How Smarter AI-Powered Cameras Can Mitigate the Spread of Wuhan Novel," AnyConnect, 22 pages, 2020.
"How to fight COVID-19 with machine learning," DataRevenue, 20 pages, accessed May 25, 2020.
Honeywell, "INNCONTROL 5," 2 pages, Aug. 8, 2018.
"IP Door Access Control," Kintronics, 21 pages, 2014.
"Kogniz AI Health Response Platform," Kogniz, 9 pages, accessed May 21, 2020.
"Machine Learning Could Check If You're Social Distancing Properly at Work," MIT Technology Review, 7 pages, Apr. 17, 2020.
Punn et al., "Monitoring COVID-19 social distancing with person detection and tracking via fine-tuned YOLO v3 and Deepsort techniques," 10 pages, May 6, 2020.
Burt, "NEC launches dual face biometric and fever detection system for access control," Biometric Update, 4 pages, May 8, 2020.
"Remote temperature monitoring," Axis Communication, 10 p. 2014.
"FebriEye—AI Based Thermal Temperature Screening System," vehant, 1 pages, 2020.
"See The World In A New Way Hikvision Thermal Cameras," Hikvision, 12 pages, 2017.
Allain, "Trying out the iPhone Infrared Camera: The FLIR One," Wired, 15 pages, 2014.
Dasgupta, "Your voice may be able to tell you if you have Covid," Hindustan Times, 4 pages, Apr. 16, 2020.
Ganguty, "Gurugram-based startup Staqu has modified AI-powered JARVIS to battle coronavirus," Yourstory, 7 pages, Mar. 31, 2020.
Trane, "Creating Input/Output Objects," 196 pages, retrieved Jul. 10, 2020.
Trane, "Using the Graphing Control Editor," 181 pages, retrieved Jul. 10, 2020.
CA Second Office Action, CA Application No. 3,054,216, dated Jul. 8, 2012 (5 pgs).

Bocicor et al. "Wireless Sensor Network based System for the Prevention of Hospital Acquired Infections", arxiv.org, Cornell University Ithaca, NY 14853, May 2, 2017, XP080947042, (Abstract).
Shhedi et al., "Traditional and ICT Solutions for Preventing the Hospital Acquired Infection", 2015 20th International Conference on Control Systems and Computer Science, IEEE, May 27, 2015, pp. 867-873, XP033188038.
Extended European Search Report, EP application No. 20151295.1, pp. 13, dated May 26, 2020.
U.S. Appl. No. 14/109,496, filed Dec. 17, 2013.
"What is the GE Nucleus Home Manager? How can a Home Manager Help with Energy Conservation?" GE Nucleus, 2 pages, printed Jan. 15, 2013. www.geappliances.com/home-energy-manager/about-energy-monitors.htm.
"Lucid Design Group—Building Dashboard Network—Apps," 7 pages, Jan. 15, 2013. www.luciddesigngroup.com/network/apps.php#homepage.
Preuveneers et al., "Intelligent Widgets for Intuitive Interaction and Coordination in Smart Home Environments," IEEE Eighth International Conference on Intelligent Environments, pp. 157-164, 2012.
Wu et al., "A Web 2.0 Based Scientific Application Framework," 7 pages, prior to Jul. 24, 2014.
"The Home Dashboard," CRBM inro@hand website, 46 pages, prior to Apr. 25, 2013.
"Free Facilities Dashboards," eSight Energy Website, 2 pages, prior to Apr. 25, 2013.
Alerton Building Controls, Gallery Prints, 7 pages, Dec. 19, 2013.
Carter, "Industrial Energy Management Dashboards Require a Toolkit," Cross Automation, 11 pages, Nov. 4, 2013.
U.S. Appl. No. 14/169,071, filed Jan. 30, 2014.
U.S. Appl. No. 14/169,083, filed Jan. 30, 2014.
U.S. Appl. No. 14/461,188, filed Aug. 15, 2014.
U.S. Appl. No. 14/482,607, filed Sep. 10, 2014.
e-homecontrols.com, "e-Home Controls Website," link to actual website no longer works, 1 page, prior to Dec. 19, 2013.
"C&C (/)—Omniboard," 5 pages, Dec. 19, 2013. http://www.ccbac.com.
"DomController Home Automation Software—Control Anything from Anywhere," 11 pages, printed Jan. 6, 2015. http://www.domcontroller.com/en/.
"Novar OPUS BAS," 1 page, prior to Feb. 13, 2013. http://www.novar.com/ems-bas/opus-building-automation-system.
"A 3D Interactive Environment for Automated Building Control," Master's Dissertation, Instituto Superior Tecnico, 120 pages, Nov. 2012.
Panduit Corp., "Enable a Building Automation with Panduit Enterprise Solutions," 4 pages, Nov. 2012.
Honeywell, "WEBs-AX Web-Enabled Building Solutions," sales brochure, Honeywell International Inc., Mar. 2009.
Honeywell, "Attune Advisory Services," press release, Honeywell International Inc., Mar. 20, 2012.
EnteliWEB Overview, web pages retrieved on May 9, 2013 from http://deltacontrols.com/products/facilities-management/supervisory-software et seq. by the Internet Archive at web.archive.org.
"BACnet Protocol Implementation Conformance Statement" for enteliWEB, Delta Controls, Jul. 17, 2013.
Castle, "7 Software Platforms that Make Building Energy Management Easy," http://greentechadvocates.com/2012/11/28/7-software-platforms-that-make-building-energy-managment-easy/, Nov. 28, 2012.
EnteliWEB "Software: Enterprise Energy Management", catalog sheet, Delta Controls, 2012.
EnteliWEB "Software: Enterprise Energy Management", catalog sheet, Delta Controls., 2010.
"Intelligent Building Management Systems in Miami," Advanced Control Corp., Mar. 7, 2013.
"The Ohio State University," BACnet International Journal, vol. 5, p. 4, Jan. 2013.
Bobker et al., "Operational Effectiveness in Use of BAS," Proceedings of the 13th International Conference for Enhanced Building Operations, Oct. 8, 2013.
Castelo, "A 3D Interactive Environment for Automated Building Control," Elsevier, Nov. 8, 2012.

(56) References Cited

OTHER PUBLICATIONS

"Creston Special Report: How Intelligent building management solutions are reducing operational costs," Creston, 2012.
"Building Automation Software Solutions," Iconics, 2013.
Lacey, "The Top 10 Software Vendors Connecting Smart Buildings to the Smart Grid," http://www.greentechmedia.com/articles/read/the-top-10-companies-in-enterprise-smart-grid, Jul. 18, 2013.
"NiagraAX Product Model Overview," Tridium, Inc., 2005.
"An Overview of NiagraAX: A comprehensive software platform designed to create smart device applications," Tridium, Inc., 2005.
"Phoenix Controls Portal," Phoenix Controls, Inc., 2013.
Quirk, "A Brief History of BIM," Arch Daily, Dec. 7, 2012.
Samad et al., "Leveraging the Web: A Universal Framework for Building Automation," Proceedings of the 2007 American Control Conference, Jul. 11, 2007.
Sinha et al., "9 Key attributes of energy dashboards and analytics tools," Aug. 28, 2013, https://www.greenbiz.com/blog/2013/08/28/9-key-attributes-energy-dashboards-and=analytics-tools.
Sinopoli, "Dashboards For Buildings," http://www/automatedbuildings.com/news/dec10/articles/sinopoli/101119034404sinopoli.html, Dec. 2010.
Sinopoli, "Modeling Building Automation and Control Systems," http://www.automatedbuildings.com/news/jun13/articles/sinopoli/130521122303sinopoli.html, Jun. 2013.
Zito, "What is Tridium Part 1," http://blog.buildingautomationmonthly.com/what-is-tridium/, May 12, 2013.
Zito, "What is Tridium Part 2," http://blog.buildingautomationmonthly.com/tridium-part-2/, Sep. 10, 2013.
International Search Report and Written Opinion dated Jul. 17, 2018 for International PCT Application No. PCT/US2018/025189 (12 pages).
"Data analytics and smart buildings increase comfort and energy efficiency", https://www.microsoft.com/itshowcase/Article/Content/845/Data-analytics-and-smart-buildings-increase-comfort-and-energy-efficiency, Dec. 19, 2016, 8 pages.
Donnelly, "Building Energy Management: Using Data as a Tool", http://www.buildingefficiencyinitiative.org/sites/default/files/legacy/InstituteBE/media/Library/Resources/Existing-Building-Retrofits/Using-Building-Data-as-a-Tool.pdf, Oct. 2012, 9 pages.
"ASHRAE Dashboard Research Project," 29 pages, Aug. 28, 2008.
Honeywell, "Energy Manager User Guide," Release 3.2, 180 pages, 2008.
"Fuzzy Logic Toolbox 2.1, Design and Stimulate Fuzzy Logic Systems," The MathWorks, 2 pages, May 2004.
"Junk Charts, Recycling Chartjunk as junk art," 3 pages, Oct. 2, 2006.
"Model Predictive Control Toolbox 2, Develop Internal Model-Based Controllers for Constrained Multivariable Processes," The MathWorks, 4 pages, Mar. 2005.
Honeywell, "Product Guide 2004," XP-002472407, 127 pages, 2004.
"Statistics Toolbox, for Use with Matlab," User's Guide Version2, The MathWorks, 408 pages, Jan. 1999.
"Vykon Energy Suite Student Guide," Tridium Inc., 307 pages, Mar. 3, 2006.
"Web Based Energy Information Systems for Energy Management and Demand Response in Commercial Buildings," California Energy Commission, 80 pages, Oct. 2003.
Andover Controls, Network News, vol. 2, No. 2, 8 pages, 1997.
Andover Controls Worid, 4 pages, Spring 1997.
Bell et al., "Early Event Detection—Results from A Prototype Implementation," AICHE Spring National Meeting, 15 pages, Apr. 2005.
CADGRAPHICS, "The CADGRAPHICS User's Guide," 198 pages, 2003.
Carrier Comfort Network CCN Web, "Web Browser User Interface to the Carrier Comfort Network," 2 pages, 2002.
Carrier Comfort Network CCN Web, Overview and Configuration Manual, 134 pages, Apr. 2006.
Carrier Comfort Network CCN Web, Product Data, 2 pages, Apr. 2006.
Carrier, "i-Vu Powerful and Intuitive Front End for Building Control," 2 pages, Aug. 2005.
Carrier, "i-Vu Web-Based Integrated Control System," 3 pages, 2005.
Carrier, Demo Screen Shots, 15 pages, prior to Aug. 27, 2007.
Carrier, i-Vu CCN 4.0, Owner's Guide, 20 pages, Jul. 2007.
Carrier, i-Vu CCN, 7 pages, 2007.
Chan, "Rank Revealing QR Factorizations," Linear Algebra and It's Applications, vol. 88-89, p. 67-82, Apr. 1987.
Circon, "i-Browse Web-Based Monitoring and Control for Facility Management," 2 pages, prior to Aug. 27, 2007.
Australian Application 2009904740, Published copy, 28 pages, Application Filed on Sep. 29, 2009.
Echelon, "Energy Control Solutions with the i.Lon SmartServer," 4 pages, 2007.
Echelon, "i.Lon 100e3 Internet Server Models 72101R-300, 72101R-308, 72102R-300, 72103-R300 . . . " 5 pages, copyright 2002-2007.
Echelon, "i.Lon 100e3 Internet Server New Features," 15 pages, Sep. 2006.
Echelon, "i.Lon SmartServer," 5 pages, 2007.
Honeywell News Release, "Honeywell's New Sysnet Facilities Integration System for Boiler Plant and Combustion Safety Processes," 4 pages, Dec. 15, 1995.
Honeywell, "Excel Building Supervisor-Integrated R7044 and FS90 Ver. 2.0," Operator Manual, 70 pages, Apr. 1995.
Honeywell Home and Building Control Bulletin, "Introduction of the S7350A Honeywell WebPAD Information Appliance," 2 pages, Aug. 29, 2000; Picture of WebPad Device with touch screen, 1 Page; and screen shots of WebPad Device, 4 pages.
Honeywell, Excel 15B W7760B Building Manager Release 2.02.00, Installation Instructions, 28 pages, Dec. 2004.
Honeywell, The RapidZone Solution, Excel 5000 Open System, Application Guide, 52 pages, Jan. 2004.
"Remote Building Monitoring and Operations Home Page," 5 pages, prior to Aug. 27, 2007.
"Carrier: i-Vu CCN," 1 page, printed Mar. 11, 2008.
Carrier: 33CSCCNWEB-01 CCN Web Internet Connection to the Carrier Comfort Network, 1 page, printed Mar. 11, 2008.
"Products," 5 pages, printed Jul. 3, 2007. http://www.docs.hvacpartners.com/idc/groups/public/documents/techlit/gs-controls-ivuccn.rtf.
Lightstat Incorporated, "Internet Programmable Communicating Thermostats," 1 page, printed Mar. 13, 2007. http://www.lightstat.com/products/istat.asp.
Sharp, "Actius RD3D Desktop Replacement Notebook with Industry-Breakthrough 3D Screen," 1 page, printed Jun. 16, 2005. http://www.sharpsystems.com/products/pc_notebooks/actius/rd/3d/.
"Lights On A Wireless Lighting Control System," 11 pages, printed Mar. 22, 2007 http://www2.sims.berkeley.edu/courses/is213/s06/projects/lightson;final.html.
I.Lon 100e3 Internet Server, 1 page, prior to Aug. 27, 2007.
I.Lon, SmartServer, 2 pages, prior to Aug. 27, 2007.
I-stat, Demo Screen Shots, 9 pages, printed Mar. 13, 2007.
I-stat, The Internet Programmable Thermostat, 2 pages, prior to Aug. 27, 2007.
Ball, "Green Goal of 'Carbon Neutrality' Hits Limit," TheWall Street Journal, 7 pages, Dec. 30, 2008.
Network Integration Engine (NIE), Johnson Controls, 3 pages, Nov. 9, 2007.
Network Integration Engine (NIE), Product Bulletin, Johnson Controls, pp. 1-11, Jan. 30, 2008.
Kourti, "Process Analysis and Abnormal Situation Detection: From Theory to Practice," IEEE Control Systems Magazine, p. 10-25, Oct. 2002.
Mathew, "Action-Oriented Benchmarking, Using CEUS Date to Identify and Prioritize Efficiency Opportunities in California Commercial Buildings," 26 pages, Jun. 2007.
Morrison et al., "The Early Event Detection Toolkit," Honeywell Process Solutions, 14 pages, Jan. 2006.

(56) References Cited

OTHER PUBLICATIONS

Narang, "WEBARC: Control and Monitoring of Building Systems Over the Web," 53 pages, May 1999.

* cited by examiner

METHODS AND SYSTEMS FOR IMPROVING INFECTION CONTROL IN A FACILITY

CROSS-REFERENCE TO RELATED APPLICATIONS

This is a continuation of co-pending U.S. patent application Ser. No. 16/561,709, filed Sep. 5, 2019, which claims the benefit under 35 U.S.C. § 119(e) of U.S. Provisional Application No. 62/727,480, filed Sep. 5, 2018, both of which are incorporated herein by reference.

TECHNICAL FIELD

The disclosure generally relates to procedural compliance of staff in a medical treatment facility, and more particularly to systems and methods for monitoring and/or correcting procedural compliance of staff in a medical treatment facility to reduce the risk of Hospital Acquired Infections (HAI).

BACKGROUND

Hospital Acquired Infections (HAI) and/or Surgical Site Infections (S SI) are infections caused by virus, bacteria and other environmental factors acquired within hospitals or other medical treatment facilities. It is estimated that HAI and SSI infections cost the healthcare industry nearly $40 billion annually. HAI and SSI infections can be transmitted in multiple ways, including, but not limited to, surface contamination, airborne particulates and aspiration. HAI and SSI infections can be reduced by following strict procedures, including procedures regarding decontamination practices, hand-hygiene/antisepsis procedures, and other procedures. However, rather low compliance with such procedures among staff have been reported.

Hand-hygiene compliance monitoring systems can be utilized in homes, daycares, schools, restaurants, health care facilities including hospitals. In some cases, hand washing compliance is a metric that hospitals and other facilities would be interested in tracking and reporting. Currently, there are several methods of gathering hand washing compliance data. These methods are often ineffective, inaccurate, costly, and/or hard to install and maintain. For example, the secret shopper method is one of the most common methods of gathering hand washing compliance data. In the secret shopper method, personnel are hired to periodically monitor hand-hygiene compliance of staff. This method can be inaccurate due to human error and the presence of a monitoring person can modify staff behavior. Another prevalent method is a real time location system (RTLS) approach where staff are tracked through an infrastructure of location beacons and anchors. This system, aside from being expensive, can be inaccurate, as the system only ensures that the staff person has passed through the vicinity of a washing station, but not that they actually washed their hands.

What would be desirable is a method and system to help improve compliance with infection control procedures such as hand-hygiene compliance.

SUMMARY

This disclosure relates to procedural compliance of staff in a medical treatment facility, and more particularly to systems and methods for monitoring and/or correcting procedural compliance of staff in a medical treatment facility to reduce the risk of Hospital Acquired Infections (HAI).

For instance, in one example, a hand-hygiene monitor may be provided that includes an accelerometer to detect vibration within a first range, a microphone to detect sound within a second range, and a transmit element to transmit data detected by the accelerometer and the microphone. Additionally, or alternatively, the hand-hygiene monitor can include one or more additional sensors. For example, the hand-hygiene monitor can include, but is not limited to, a light sensor, a radar, a humidity sensor, a temperature sensor, a motion detector, a magnetometer, or a combination thereof. The additional sensors can provide additional data and/or increase accuracy of the hand washing compliance data.

In some examples, the hand-hygiene monitor may be included in a system. The system may also include a processor, which may receive the data from the hand-hygiene monitor. The processor can, for example, be configured to determine whether a person has washed their hands by analyzing data from the hand-hygiene monitor. In some embodiments, the processor can use a machine learning model to improve the accuracy of the system over time. In some embodiments, the processor can be included in a cloud server.

The system may also include a tracking device. The tracking device may be included in an identification card, for example. In some examples, the tracking device may be used in combination with the data from the hand-hygiene monitor to identify the person, the person's location, and/or whether or not they are in compliance with washing their hands.

In a first example, a system for monitoring hand-hygiene of staff in a facility may comprise a plurality of sensors positioned adjacent a hand washing station. Each of the plurality of sensors may be free from imaging pixels that form a visually perceptible image of the hand washing station. Each of the plurality of sensors is configured to provide a corresponding sensor output signal that is indicative of whether a person is washing their hands at the hand washing station or not, and at least two of the plurality of sensors are of a different sensor type. A controller may be configured to fuse the sensor output signals from each of two or more of the plurality of sensors and to determine using the fused sensor output signals whether the person has washed their hands at the hand washing station in compliance with one or more predetermined criteria or not. The controller may be further configured to output a notification when the controller has determined that the person has washed their hands at the hand washing station in compliance with the one or more predetermined criteria.

In some cases, the plurality of sensors may comprise an accelerometer and/or a microphone, and optionally one or more of a light sensor, a radar sensor, a humidity sensor, a temperature sensor, a motion detector, and/or a magnetometer. In some cases, the controller may fuse the sensor output signals from the accelerometer and the microphone.

In some cases, the one or more predetermined criteria may comprise two or more distinct hand washing steps which may include a hand scrubbing step and a dispensing of soap step. The two or more distinct hand washing steps may also comprise approaching the hand washing station, dispensing of soap at the hand washing station, hand scrubbing at the hand washing station, and departing from the hand washing station.

In some cases, the controller may be further configured to identify and record an identity of the person washing their hands at the hand washing station, and whether the hand washing was in compliance with the one or more predetermined criteria.

In some cases, the system may further comprise an RFID reader for reading an RFID tag carried by the person. The controller may be operatively connected to the RFID reader and may be configured to identify the person washing their hands based on the RFID tag read by the RFID reader.

In some cases, the controller may be configured to determine if the hand scrubbing step lasted at least a minimum duration of time with at least a minimum level of vigor.

In another example, a system for monitoring hand-hygiene of staff in a facility may comprise a plurality of sensors positioned adjacent a hand washing station including an accelerometer and a microphone. Each of the plurality of sensors may be configured to provide a corresponding sensor output signal that is indicative of whether a person is washing their hands at the hand washing station or not. A controller may be configured to use the sensor output signals from the accelerometer and the microphone to determine whether the person has washed their hands at the hand washing station in compliance with one or more predetermined criteria or not. The controller may be further configured to output a notification when the controller has determined that the person has washed their hands at the hand washing station in compliance with the one or more predetermined criteria.

In some cases, the plurality of sensors may further comprise one or more additional sensors. The one or more additional sensors may comprise one or more of a light sensor, a radar sensor, a humidity sensor, a temperature sensor, a motion detector, and/or a magnetometer. The controller may be configured to use the sensor output signals from one or more of the additional sensors to determine whether the person has washed their hands at the hand washing station in compliance with the one or more predetermined criteria.

In some cases, the controller may be configured to fuse the sensor output signals from the accelerometer, the microphone and one or more of the additional sensors to determine whether the person has washed their hands at the hand washing station in compliance with the one or more predetermined criteria or not.

In some cases, the one or more predetermined criteria may comprise two or more distinct hand washing steps. The two or more distinct hand washing steps may comprise a hand scrubbing step and a dispensing of soap step.

In another example, a method for monitoring hand-hygiene of staff in a facility may comprise determining whether a person has washed their hands at a hand washing station in compliance with one or more predetermined criteria or not using two or more sensor outputs from two or more sensors positioned adjacent the hand washing station. Each of the two or more sensors may be free from imaging pixels that form a visually perceptible image of the hand washing station. At least two of the two or more sensors are of a different sensor type. The one or more predetermined criteria may comprise two or more distinct hand washing steps including a dispensing of soap step and a hand scrubbing step. The method may further comprise reporting whether the person has washed their hands at the hand washing station in compliance with the one or more predetermined criteria.

In some cases, the two or more sensors may comprise an accelerometer and/or a microphone, and one or more of a light sensor, a radar sensor, a humidity sensor, a temperature sensor, a motion detector, and/or a magnetometer.

In some cases, the method may further comprise fusing two or more sensor outputs from the two or more sensors to increase a confidence level in the determination of whether the person has washed their hands at the hand washing station in compliance with the one or more predetermined criteria or not.

In some cases, the method may further comprise determining whether the two or more distinct hand washing steps occurred in a predetermined order and/or whether one or more of the two or more distinct hand washing steps lasted for at least a predetermined time period.

The preceding summary is provided to facilitate an understanding of some of the features of the present disclosure and is not intended to be a full description. A full appreciation of the disclosure can be gained by taking the entire specification, claims, drawings, and abstract as a whole.

BRIEF DESCRIPTION OF THE DRAWINGS

The disclosure may be more completely understood in consideration of the following detailed description of various embodiments in connection with the accompanying drawings, in which.

Figure 1:
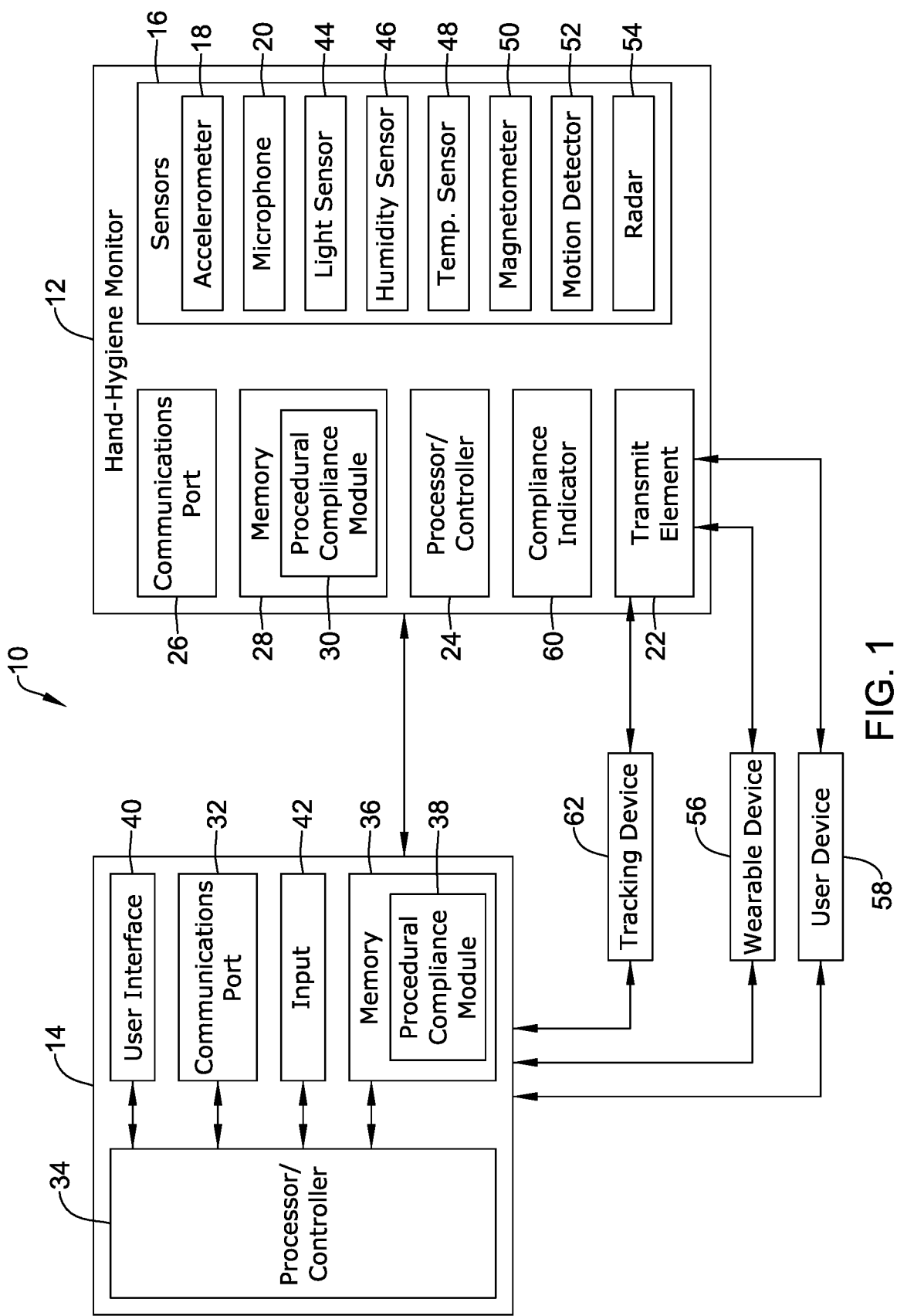
FIG. 1 is a schematic block diagram of an illustrative system for monitoring procedural compliance of staff in a facility.

While the disclosure is amenable to various modifications and alternative forms, specifics thereof have been shown by way of example in the drawings and will be described in detail. It should be understood, however, that the intention is not to limit aspects of the disclosure to the particular embodiments described. On the contrary, the intention is to cover all modifications, equivalents, and alternatives falling within the spirit and scope of the disclosure.

DESCRIPTION

The following detailed description should be read with reference to the drawings in which similar elements in different drawings are numbered the same. The detailed description and the drawings, which are not necessarily to scale, depict illustrative embodiments and are not intended to limit the scope of the disclosure. The illustrative embodiments depicted are intended only as exemplary. Selected features of any illustrative embodiment may be incorporated into an additional embodiment unless clearly stated to the contrary.

These embodiments are described in sufficient detail to enable those of ordinary skill in the art to practice one or more embodiments of this disclosure. It is to be understood that other embodiments may be utilized and that process changes may be made without departing from the scope of the present disclosure.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure and should not be taken in a limiting sense.

As used herein, "a" or "a number of" something can refer to one or more such things. For example, "a number of devices" can refer to one or more devices.

Hospital Acquired Infections (HAI) and/or Surgical Site Infections (SSI) are infections caused by virus, bacteria and other environmental factors acquired within hospitals or other medical treatment facilities. HAI and SSI infections can be transmitted in multiple ways, including, but not limited to, surface contamination, airborne particulates and aspiration. HAI and SSI infections can be reduced by following strict procedures, including procedures regarding decontamination practices, hand-hygiene/antisepsis procedures, and other procedures. This may include, but not limited to, operating room personnel, physicians, nursing staff, custodial staff, etc. However, rather low compliance to such procedures among staff have been reported.

One example of a procedure where compliance can be important is in an operating room (OR). In the case of an OR, all sterile team members should perform a hand and arm scrub before entering the surgical suite. The basic principle of the scrub is to wash the hands thoroughly, and then to wash from a clean area (the hand) to a less clean area (the arm). A systematic approach to the scrub is an efficient way to ensure proper technique. There are typically two methods of scrub procedure. One is a numbered stroke method, in which a certain number of brush strokes are designated for each finger, palm, back of hand, and arm. An alternative method is a timed scrub, and each scrub should last from three to five minutes, depending on facility protocol.

This disclosure generally relates to method and systems for monitoring procedural compliance of staff in a facility such as hand-hygiene compliance, while maintaining patient and/or staff privacy, and for providing real time notification to the staff when a procedure is performed incorrectly or not at all. In one example, the present disclosure discloses methods, devices, systems, and computer-readable media useful for monitoring hand-hygiene. In some instances, hand-hygiene compliance data is gathered using a hand-hygiene monitor. The hand-hygiene monitor may include distributed synthetic sensors that are minimally obtrusive to detect and alert hand-hygiene incidents. The sensors may be placed so that a lapse in handwashing procedures can be positively identified and alerted. The sensors used may include, for example, microphones, accelerometers, ambient light, and/or other sensors. In some cases, such sensors may be used in conjunction with edge analytics to detect a faucet open and hand washing events. In some cases, a radiofrequency (RF) radar based sensor maybe used to detect the presence of a person at a hand washing station, and in some instances, a hand washing motion of the hands. Fusion of the results of various sensing modalities may help identify hand washing compliance with greater certainty, while maintaining patient and/or staff privacy (e.g. free from imaging pixels that together can be used to form a visually perceptible image of the hand washing station). While the system is described with respect to a medical facility, it is contemplated that the system may be used in other environments to ensure procedural compliance, such as, but not limited to, senior care facilities, nursing homes, restaurants, hotels, office buildings, etc.

FIG. 1 is a schematic block diagram of an illustrative system 10 for monitoring procedural compliance (e.g., hand washing or hand-hygiene) of staff in a hospital or other clinical setting. The illustrative system 10 may determine if a person has washed their hands at a hand washing station in compliance with one or more predetermined criteria. The determination may be made without the use of cameras that have imaging pixels that output a visually perceptible image of the hand washing station. In some cases, the system 10 may be configured to use synthetic sensors that are minimally obtrusive to detect and alert hand-hygiene incidents. Generally, the system 10 may include a hand-hygiene monitor 12 and a computing device 14. In some cases, the information processing may be performed at the hand-hygiene monitor 12 and a separate computing device 14 may not be required. In some instances, the system 10 may include a wearable device 56 (e.g., a watch, a bracelet, a fitness tracker, an identification badge, etc.), a user device 58 (e.g., a cell phone, a tablet computer, etc.) carried by the person entering the room, and/or a tracking device 62, but these are not required in all cases.

In some cases, the hand-hygiene monitor 12 may be a separate system that is placed in a particular area (e.g., near a hand washing station) or worn by a person as an identification card, a smart phone, or a wearable (e.g., pendant, smart watch, smart glasses, etc.), for example. When worn by a person, some or part of the hand-hygiene monitor 12 may be worn on both wrist and/or both hands. For example, some or part of the hand-hygiene monitor 12 may be incorporated into a watch, bracelet, ring, etc. and may be worn on one arm/hand or both arms/hands.

The illustrative hand-hygiene monitor 12 may include a communications port 26 for operatively coupling to a computing device 14, a wearable device 56, a user device 58, and/or a tracking device 62 when present. It is contemplated that the communications port 26 may be wired and/or wireless. When the communications port 26 is wireless, the communications port 26 may include a wireless transceiver, and the computing device 14, the wearable device 56, the user device 58, and/or the tracking device 62 may include a compatible wireless transceiver. It is contemplated that the wireless transceivers may communicate using a standard and/or a proprietary communication protocol. Suitable standard wireless protocols may include, for example, cellular communication, ZigBee, Bluetooth, WiFi, IrDA, dedicated short range communication (DSRC), EnOcean, or any other suitable wireless protocols, as desired.

The hand-hygiene monitor 12 may include one or more controllers or processors 24 that execute instructions stored in the system memory 28. In some cases, the controller 24 may include a programmable microprocessor. Such a programmable microprocessor may allow a user to modify the control logic of the hand-hygiene monitor 12 even after it is installed in the field (e.g., firmware update, application update). The system memory 28 of the hand-hygiene monitor 12 can include computer system readable media in the form of volatile memory, such as random access memory (RAM) and/or cache memory. The hand-hygiene monitor 12 may further include other removable/non-removable, volatile/non-volatile computer system storage media. By way of example only, the storage system can be provided for reading from and writing to a non-removable, non-volatile magnetic media (not shown and typically called a "hard drive" or flash memory). The system controller 24 and/or memory 28 may include at least one program/utility having a set of program modules that are configured to receive an input from or transmit an output to a remote computing device 14, a wearable device 56, a user device 58, and/or a tracking device 62.

In one example, the program/utility may be stored in the system memory 28 and may include one or more application program modules (e.g., software), such as a procedural compliance module 30. The procedural compliance module 30 may define one or more hand washing procedures that should be performed in a particular room of a facility in order to reduce the risk of infection. Each defined procedure may include one more predefined criteria, conditions, or actions that should be taken in order for the procedure to have been considered as performed correctly or to a set standard, as will be described in more detail herein. It is contemplated that the defined procedures may be different for different types of rooms and/or a category type of the person entering the room. For example, the defined procedures for an Operating Room (OR) may be different than the defined procedures for a patient room. In some cases, the procedural compliance module 30 may be a part of the hand-hygiene monitor 12 or may be executed on the remote computing device 14, as will be described in more detail herein.

The illustrative hand-hygiene monitor 12 may include a plurality of sensors 16. In some instances, the plurality of sensors 16 may work together to provide a synthetic sensor. A synthetic sensor can be considered a plurality of sensors that sense different conditions within an environment (e.g., motion, humidity, vibration, etc.), and where the different sensed conditions are fused to detect certain actions or conditions. A plurality of sensors 16 may be positioned adjacent to a hand washing station. In some embodiments, the hand-hygiene monitor 12 may include at least two sensors with at least two different sensor types. In some implementations, the plurality of sensors 16 of the hand-hygiene monitor 12 may include at least an accelerometer 18 and a microphone 20, an accelerometer 18 and a radar 54, and/or a microphone 20 and a radar 54. These are just some examples. The hand-hygiene monitor 12 may include additional sensors as well, including, but not limited to a light sensor 44, a humidity sensor 46, a temperature sensor 48, a magnetometer 50, a motion detector 52, etc. or a combination thereof. To help protect patient and staff privacy, it is contemplated that each of the sensors 16 may be free from imaging pixels that form a visually perceptible image of the hand washing station and/or surrounding area. As will be described in more detail herein, each sensor of the plurality of sensors 16 may provide a corresponding sensor output signal that is indicative of whether a person is washing their hands at the hand washing station or not. For example, the sensor output signal for an accelerometer 18 fixed to the sink of the hand washing station may collect a vibration signature that is indicative of running water, a vibration signature that is indicative of hand washing under running water, etc. The sensor output signal for an accelerometer 18 fixed to a bracelet of the staff member may collect a motion signature that signifies that the person is moving their hand(s) in a hand washing motion. In another example, the sensor output signal for the microphone 20 may collect a sound signature that is indicative of running water and/or hand washing under running water. In yet another example, the sensor output signal for the radar 54 may collect a radar signature that is indicative of running water and/or hand washing under running water. The sensor output signal for the humidity sensor 46 may detect an increase in humidity that is indicative of running water and/or hand washing under running water. When such sensor output signals are fused together, sometimes with various weighting factors, compliance with a set hand washing procedure may be detected with greater certainty, while protecting patient and/or staff privacy. That is, the controller 24 and/or procedural compliance module 30 may use the fused sensor signal output to determine whether the person has washed their hands at the hand washing station in compliance with one or more predetermined criteria or not. It contemplated that the controller 24 and/or procedural compliance module 30 may be configured to output a notification when the controller 24 and/or procedural compliance module 30 has determined that the person has washed their hands at the hand washing station in compliance with the one or more predetermined criteria and/or when the person has not washed their hands at the hand washing station in compliance with the one or more predetermined criteria.

In one specific example, when the accelerometer 18 is fixed to the sink base, the accelerometer 18 can detect water flow. As water flows from the faucet and contacts the sink base, the accelerometer 18 can detect the vibrations generated by the flowing water. Thus, the accelerometer 18 can determine whether the faucet is running based on the vibration the faucet creates when the faucet is on and allowing water to flow. It is further contemplated that the accelerometer 18 can also detect when hands are interrupting the flow of water. For example, when hands are interrupting the water flow, different vibration signature may be produced than when the water is flowing uninterrupted from the faucet to the sink basin. In some cases, the accelerometer 18 may discern a difference between a person holding their hand(s) stationary under the flow of water and making a scrubbing motion with their hands under the flow of water. This can be discerned because the scrubbing motion creates a different vibration signature at the accelerometer 18 than holding one or both hands stationary under the faucet.

In some embodiments, the accelerometer 18 and/or the processor 24 may also record how long the faucet was running and/or how long the person was washing their hands based on the length of the various detected vibration signatures. In some examples, a person could be deemed non-compliant with hand washing procedures when the person did not actively wash their hands for at least a minimum period of time. The vibration signature of the faucet running and/or the vibration signature of hands interrupting the flow of water can be used to determine whether a person washed their hands for at least the minimum period of time necessary to be compliant with the defined hand washing procedures. In some examples, the accelerometer 18 may also detect the vibration due to soap dispensing, a hand dryer blowing, a person drying their hands, or a paper towel dispensing, for example. Similar to the faucet, the accelerometer 18 can detect vibration signatures that are unique to each of these actions. As detailed further herein, other sensor outputs (e.g. microphone 20, light sensor 44, humidity sensor 46, temperature sensor 48, magnetometer 50, motion detector 52 and radar 54) may be fused with the accelerometer output to increase the certainty of the compliance decision. In some cases, each of the following actions or steps may be detected using the accelerometer 18:

1) water flowing from a faucet into a sink basin with no interference;
2) soap dispensing;
3) water flowing from a faucet into a sink basin with stationary hands positioned within the water flow;
4) water flowing from a faucet into a sink basin with moving hands (e.g., scrubbing) positioned within the water flow;
5) a hand dryer blowing;
6) a person drying their hands in a hand dryer; and
7) a paper towel dispensing.

The preceding list of actions and/or steps of a handwashing procedure (compliant or otherwise) is not intended to be inclusive of all actions and/or steps that can be used to determine if a handwashing procedure is compliant or not, but rather indicative of some of the types of actions that can be recognized and used.

The microphone 20 of the hand-hygiene monitor 12, when provided, can detect sound within a particular frequency range, and in some cases a direction of the sound. In some cases, a plurality of microphones 20 may be distributed around a hand washing sink, but this is not required. The microphone(s) 20 can detect water contacting the sink basin from the faucet and/or the water contacting the sink basin from the person's hands. Each of these events can create a unique sound signature. Moreover, a scrubbing motion of the hands under the flow of water can create a unique sound signature relative to a person simply holding their hands stationary under the flow of water. In some instances, the microphone 20 can detect the sound of a soap dispenser being activated or pumped. Identification of each of these events may be enhanced when more than one microphone is distributed about the hand washing station. Using more than one microphone may also help determine the direction of the sound, which may be used to help identify and/or distinguish between events. A person could be deemed noncompliant with washing their hands if the person did not use soap. In some cases, the microphone 20 can detect the sound of a hand dryer blowing, a person drying their hands, and/or a paper towel dispensing, etc. In some cases, each of the following actions or steps may be detected using the microphone 20:

1) water flowing from a faucet into a sink basin with no interference;
2) soap dispensing;
3) water flowing from a faucet into a sink basin with stationary hands positioned within the water flow;
4) water flowing from a faucet into a sink basin with moving hands (e.g., scrubbing) positioned within the water flow;
5) a hand dryer blowing;
6) a person drying their hands in a hand dryer; and
7) a paper towel dispensing.

The preceding list of actions and/or steps of a handwashing procedure (compliant or otherwise) is not intended to be inclusive of all actions and/or steps that can be used to determine if a handwashing procedure is compliant or not, but rather indicative of some of the types of actions that can be recognized and used.

The motion detector 52 and/or the radar 54, when present, may be used to detect the presence of a person in an area. The motion detector 52 can sense any movement within a particular area. The particular area can be a bathroom or an area in proximity to a faucet and/or sink. The motion detector 52 data can indicate that an object was moving for a period of time, which can suggest that a person was in the bathroom or in front of a faucet for a particular amount of time. This time can be compared to a threshold quantity of time to determine if a person may have been washing hands and/or whether the amount of time was sufficient. For example, movement in front of the faucet for twenty seconds could indicate that a person washed their hands for a sufficient period of time.

The radar 54, unlike the motion detector 52, can detect a particular location of one or more people. The radar 54 can also detect the location of a person without the use of tags worn on the person. However, it is contemplated that radiofrequency tags can be used to determine an identity of a person and/or to place the person at a specific location (near an RF reader, for example). In some cases, the radar 54 can detect whether a person is standing within a particular proximity to a faucet. The radar 54 may also detect whether another person is standing within a particular proximity to another faucet. As such, radar 54 can be used in areas with one or more sinks and can collect location data on multiple people at a time. Various types of radar 54 can be included in the hand-hygiene monitor 12. In some embodiments, the radar 54 can be a pulse-doppler radar. In other embodiments, the radar 54 can be a frequency-modulated continuous wave radar. It is contemplated that the radar 54 may be used to detect a person entering hand washing area and/or a person exiting the hand washing area. It is also contemplated that the radar 54, when directed at the sink, may be used to detect water flow without hand in the water flow, water flow with hands in the water flow, a hand washing motion of the hands, a scrubbing motion of the hands/arms, etc. Some illustrative procedural compliance systems utilizing radar tracking are described in commonly assigned U.S. patent application Ser. No. 16/522,326 titled "Methods and Systems for Improving Infection Control in a Facility," the disclosure of which is hereby incorporated by reference.

It is contemplated that the processor 24 and/or procedural compliance module 30 of the hand-hygiene monitor 12 may combine or fuse the sensor output signals from the accelerometer 18, the microphone 20, the radar 54 and/or other sensor. In one example, both the microphone 20 and/or the accelerometer 18 are used to detect the faucet running and a hand washing motion under the running water, but if neither sensor detected soap dispensing, the data collected from the sensors of the hand-hygiene monitor 12 could suggest that the person did not use soap. This could result in the procedural compliance module 30 determining that the person is noncompliant with the hand washing procedures. It is further contemplated that the location of the person (e.g., if the person has entered and/or exited the hand washing area) may be verified or determined by the radar 54. Also, the radar 54 may be used to detect hand washing motion under a water flow, which may be used to confirm a hand washing motion detected by the accelerometer 18 and/or microphone 20. This is just one example.

In some instances, a time duration that one or more of these activities occur (e.g., a time duration of each action or step) can be tracked and compared to a threshold quantity of time appropriate for a specific activity to help determine whether the hand washing was in compliance with hand washing procedures. For example, a vibration signature indicative of interrupting the flow of water for twenty seconds could indicate that a person washed their hands for a sufficient period of time (e.g. greater than twenty seconds).

As described herein, sensors 16 in addition to (or in place of) the accelerometer 18 and/or microphone 20 may also be provided in the hand-hygiene monitor 12. For example, as described above, the hand-hygiene monitor 12 may include a light sensor 44, a humidity sensor 46, a temperature sensor 48, a magnetometer 50, a motion detector 52, a radar 54, and/or a combination thereof.

A light sensor 44 can detect whether a light is on. If the light is on in, for example, a bathroom this may be indicative of a person being present in the bathroom. For example, many people turn lights off in a bathroom to conserve energy when the bathroom is not in use. In some examples, the lights in a bathroom are coupled to a motion detector and the lights turn off after no motion has been detected after a particular period of time. As such, data collected from a light sensor 44 can indicate a person is not present, in response to the light sensor 44 detecting less than a threshold amount of light and/or no light.

A humidity, temperature and/or magnetic forces in an area can change in response to a faucet running. In some examples, the humidity, temperature, and/or magnetic forces in an area can change in response to a person being present. As such, it is contemplated that data from the humidity sensor 46, temperature sensor 48, and/or magnetometer 50 can be used to determine whether a faucet is running and/or whether a person is present, for example. Other sensors can provide additional data and/or signatures to help increase the accuracy of the hand washing compliance determination. The sound and/or vibration signatures independently, together, or in combination with additional sensors can be used to determine whether or not a person washed their hands. The sound and/or vibration signatures independently, together, or in combination with other sensors can also be used to determine how long the person washed their hands.

In some examples, analyzing a combination of the sound signatures, vibration signatures, and/or a combination of sound signatures, vibration signatures and other sensor data can increase the overall accuracy of the processor 24 and/or procedural compliance module 30 in determining whether a person is compliant with washing their hands.

The hand-hygiene monitor 12 may further include a transmit element 22. The transmit element 22 may be a transmitter or transceiver. For example, the transmit element 22 can be a radio frequency (RF) transceiver. In some examples, the transmit element 22 can be wired or wirelessly coupled to a processor and/or controller 24. The transmit element 22 can transmit data detected and collected by sensors 16 of the hand-hygiene monitor 12 and/or a determination of compliance/non-compliance with established hand washing procedures. The transmit element 22 can transmit the data to an external computing device 14 and/or to another device 56, 58, 62.

In some examples, the processor 24 and/or procedural compliance module 30 of the hand-hygiene monitor 12 can use a machine learning model to determine whether a person washed their hands. For example, machine learning methods may be used (for example, a support vector machine, deep neural networks, multi-way support vector machine, etc.) to detect hand washing events through the microphone 20, accelerometers 18, and/or other sensors 16 data. In parallel, a point cloud from a radar 54 may be used to deduce the position and identity of the personnel. The output of these two systems may be fused to come to a conclusion (e.g., the person did or did not wash their hands). In some cases, the sensor 16 data including the radar 54 may be input to a combined machine learning model that determines the presence, identity and hand washing compliance all together. In yet another example, different machine learning models are created as an ensemble and run in parallel—the results are then fused and used to establish whether the hand washing was in compliance.

The hand-hygiene monitor 12 may include a compliance indicator 60. Although the compliance indicator 60 is shown included in the hand-hygiene monitor 12, the compliance indicator 60 can be outside of the hand-hygiene monitor 12. For example, the compliance indicator 60 can be a separate device, built into a wearable device 56, built in to a user device 58, and/or a part of the computing device 14. The compliance indicator 60 can provide a visual, audible and/or haptic signal to a person to indicate whether the person has complied with, or is in compliance with, a hand washing procedure. Hand washing compliance can be tracked for a single hand washing activity or, in some embodiments, can be tracked over a period of time, such as a period of hours, days, weeks, months, years, etc. The signal of the compliance indicator 60 can be, but is not limited to, a light, a symbol, a tone, a haptic vibration, and/or a combination thereof.

In some embodiments, the compliance indicator 60 can display a green light in response to the processor 24 and/or procedural compliance module 30 determined that a person washed their hands in compliance with hand washing standards. In some examples, the compliance indicator 60 can display a red light in response to the processor 24 and/or procedural compliance module 30 determined that a person did not wash their hands in compliance with the hand washing standards. In some embodiments, the system 10 can include multiple compliance indicators that each indicate compliance with a particular sub-activity involving in compliant hand-washing, such as a first indicator for washing and a different indicator for using soap. Alternatively, the indicator could have multiple states at which it changes to a different state each time a sub-activity is accomplished (e.g., a first state for hand washing, a second state for using soap, a third state for using a towel, etc.).

In some embodiments, the compliance indicator 60 can change visual signals in response to a person washing their hands, washing their hands for a particular amount of time, or once soap is dispensed. For example, the compliance indicator 60 can display a red light until the processor 24 and/or procedural compliance module 30 indicates that the person has washed their hands for thirty seconds, at which time the compliance indicator 60 can display a green light to let the person know that they can stop washing their hands.

As described herein, the computing device 14 may be operatively coupled to the hand-hygiene monitor 12. The computing device 14 may be a system specific controller, a desktop computer, a laptop computer, a tablet, a cloud based computing device, a cloud server, etc. When the hand-hygiene monitor 12 is equipped with a processing device 24 and memory 28, the computing device 14 may not be required for the function of the system 10. When the computing device 14 is provided, the computing device 14 may be located in a same room as the hand-hygiene monitor 12, in a different room but a same building as the hand-hygiene monitor 12, or off-site (e.g., geographically different location) from the hand-hygiene monitor 12, as desired. The computing device 14 may include a communications port 32 for communicating with the hand-hygiene monitor 12 (or other devices, such as but not limited to, cell phones, wearable devices, etc.), the wearable device 56, the user device 58, and/or tracking device 62. In some cases, the computing device 14 may include more than one communications port 32 for communicating over more than one network (e.g., wireless LAN, wired LAN, the Internet, short range wireless communications, etc.). In some instances, the communications port 32 may be a radiofrequency (RF) transceiver.

The computing device 14 may further include a processor 34 (e.g. microprocessor, microcontroller, etc.) and a memory 36. The computing device 14 may also include a user interface 40. The user interface 40 may be a display or other means for allowing a user to interact with the computing device 14. The user interface 40 may be part of a personal computer, tablet computer, smart phone, laptop computer, or may include a standalone display. In some instances, the computing device 14 may include a user input 42 for receiving a user input from a user. For example, the user input may include a keyboard, mouse, actuatable buttons, or a touchscreen display. These are just examples.

The memory 36 may be used to store any desired information, such as the aforementioned procedural compliance module. The memory 36 may be any suitable type of storage device including, but not limited to, RAM, ROM, EPROM, flash memory, a hard drive, and/or the like. In some cases, the processor 34 may store information within the memory 36, and may subsequently retrieve the stored information from the memory 36. In some cases, the memory 36 may store one or more application program modules (e.g., software), such as a procedural compliance module 38. The procedural compliance module 38 may be the same as or different from the procedural compliance module 30 associated with the hand-hygiene monitor 12. The procedural compliance module 38 may include one or more defined procedures that should be performed in a particular room of a facility in order to reduce the risk of infection. Each defined procedure may include one more conditions or actions that should be met in order for the procedure to have been considered as performed correctly or to a standard, as will be described in more detail herein. It is contemplated that the defined procedure may be different for different types of rooms and/or a category type of the person entering the room. In some cases, only one of the hand-hygiene monitor 12 or the computing device 14 is provided with a procedural compliance module 30, 38. In other cases, both the hand-hygiene monitor 12 and the computing device 14 are provided with a procedural compliance module 30, 38.

In some embodiments, a weighting value can be applied to one or more sensor data values if it is determined that a particular type of data is more predictive of a person having good hand-hygiene. For example, accelerometer data may be more reliable than microphone data and therefore a higher weighting value could be applied to one or more accelerometer data values relative to microphone data values. This is just one example. Other weighting schemes may be used, as desired. Alternatively, or in addition, a machine learning model can be used by the processor 24 and/or procedural compliance module 30 of the hand-hygiene monitor 12 and/or the processor 34 and/or procedural compliance module 38 of the computing device 14 to determine whether a person was complaint in washing their hands. Data from the accelerometer 18, data from the microphone 20, and/or data from other sensors 16 can be input into the machine learning model to determine whether a person properly washed their hands. The machine learning model can be, but is not limited to, a support vector machine, a deep neural network, a multi-way support vector machine, or any other suitable machine learning and/or artificial intelligence model or algorithm.

The processor 24 and/or procedural compliance module 30 of the hand-hygiene monitor 12 and/or the processor 34 and/or procedural compliance module 38 of the computing device 14 can use a machine learning model including statistical techniques to improve the accuracy of the system 10 over time. In some examples, machine learning and/or artificial intelligence can be used to perceive an environment, such as a bathroom, and adjust sensors and/or adjust a weighting value that the processor 24 and/or procedural compliance module 30 of the hand-hygiene monitor 12 and/or the processor 34 and/or procedural compliance module 38 of the computing device 14 gives data from particular sensors to improve probability of accurately determining whether a person complied with hand washing procedures.

The processor 24 and/or procedural compliance module 30 of the hand-hygiene monitor 12 and/or the processor 34 and/or procedural compliance module 38 of the computing device 14 can include an iterative learning component. The machine learning model can be updated periodically to incorporate idiosyncrasies of the environment that the hand-hygiene monitor 12 is in. In some examples, the machine learning model can be updated to suppress particular sounds, for example, the sound of doors opening and/or closing. Moreover, the particular hand washing procedures may differ depending on the location within the facility. For example, more rigorous hand washing/scrubbing may be required at a and washing station servicing an operating room relative to a hand washing station servicing a patient room. The machine learning model can learn to identify the particular hand washing procedures associated with a particular location.

The processor 24 and/or procedural compliance module 30 of the hand-hygiene monitor 12 and/or the processor 34 and/or procedural compliance module 38 of the computing device 14 can save the processor executable instructions that provide the machine learning component in the respective memory 28, 36. The processor 24 and/or procedural compliance module 30 of the hand-hygiene monitor 12 and/or the processor 34 and/or procedural compliance module 38 of the computing device 14 can also save compliance data in the respective memory 28, 36. In some cases, the memory 28, 36 can include statistical data on people washing their hands, people washing their hands for a particular time, people washing their hands with soap, and/or a combination thereof.

The wearable device 56, when provided, may be device that is worn by or carried by a person (e.g., staff member). In some cases, the wearable device 56 may allow the system 10 to identify the staff member or a staff member classification (e.g., physician, nurse, food service, etc.) when they enter a room. The identity of the staff member may then be used to determine which procedure the staff member is expected to comply with when entering a particular room, if any. In some instances, the wearable device 56 may be used to help identify the location of the person in the room. For example, the location of the person may be identified when the person is in proximity to another device in the room capable of receiving a signal transmitted by the wearable device 56 (e.g. beacon, RF tag reader, etc.).

In one example, the wearable device 56 may be a network or internet enabled bracelet or watch. It is contemplated that in addition to providing information regarding the staff member, a bracelet may be equipped with gesture tracking technology and/or other sensors such as but not limited to an accelerometer, a gyroscope, a magnetometer, a humidity sensor, a temperature sensor, a moisture sensor, a microphone, etc. When so provided and worn on a wrist, a wearable device 56 may be used to provide information which may be used to determine if certain procedures are being followed (e.g., hand sanitizing, hand washing, etc.), as will be described in more detail herein. In other examples, the wearable device 56 may be an employee badge with a radiofrequency (RF) tag. It is contemplated that other wearable devices 56 may also be used, including, but not limited to, rings, necklaces, cell phones, etc. In some cases, the wearable device 56 may be include a wireless transceiver to wirelessly communicate with the hand-hygiene monitor 12, the computing device 14, the user device 58 and/or any other suitable device. When so provided, it is contemplated that the wireless transceivers may communicate using a standard and/or a proprietary communication protocol. Suitable standard wireless protocols may include, for example, cellular communication, ZigBee, Bluetooth, WiFi, IrDA, dedicated short range communication (DSRC), EnOcean, or any other suitable wireless protocols, as desired. In some embodiments, the system 10 may not include a wearable device 56.

The user device 58, when provided, may be a device carried by a staff member as they are performing their duties. The user device 58 may include, but is not limited to, mobile devices including smart phones, tablet computers, laptop computers, wireless network-enabled key fobs, e-readers, and/or the like. The user device 58 may be configured to receive messages from the hand-hygiene monitor 12 and/or the computing device 14 regarding a procedure that is expected to be performed in a particular room. In some cases, the messages may be informing the staff member of the procedural requirements. In other cases, the messages may be informing the staff member that they have failed to perform a procedure or performed it incorrectly, as will be described in more detail herein. In some embodiments, the system 10 may not include a user device 58.

In some instances, the system 10 may include a tracking device 62. It is contemplated that the tracking device 62 may be a part of the wearable device 56 and/or the user device 58. For example, the tracking device 62 can be included in an identification card, for example. In other embodiments, the tracking device 62 may be a separate entity. In some cases, the tracking device 62 can be a vector or real-time location system (RTLS).

In some examples, the tracking device 62 can be used in combination with the data from the hand-hygiene monitor 12 to identify a person and whether or not the person was in compliance with washing their hands. For example, the processor 24 and/or procedural compliance module 30 can match the hand-hygiene monitor 12 data at a particular time with a particular person in response to the tracking device 62 placing the person in front of the sink where the hand-hygiene monitor 12 is located at the particular time. The memory 28 can also include such tracking device 62 data.

Figure 2:
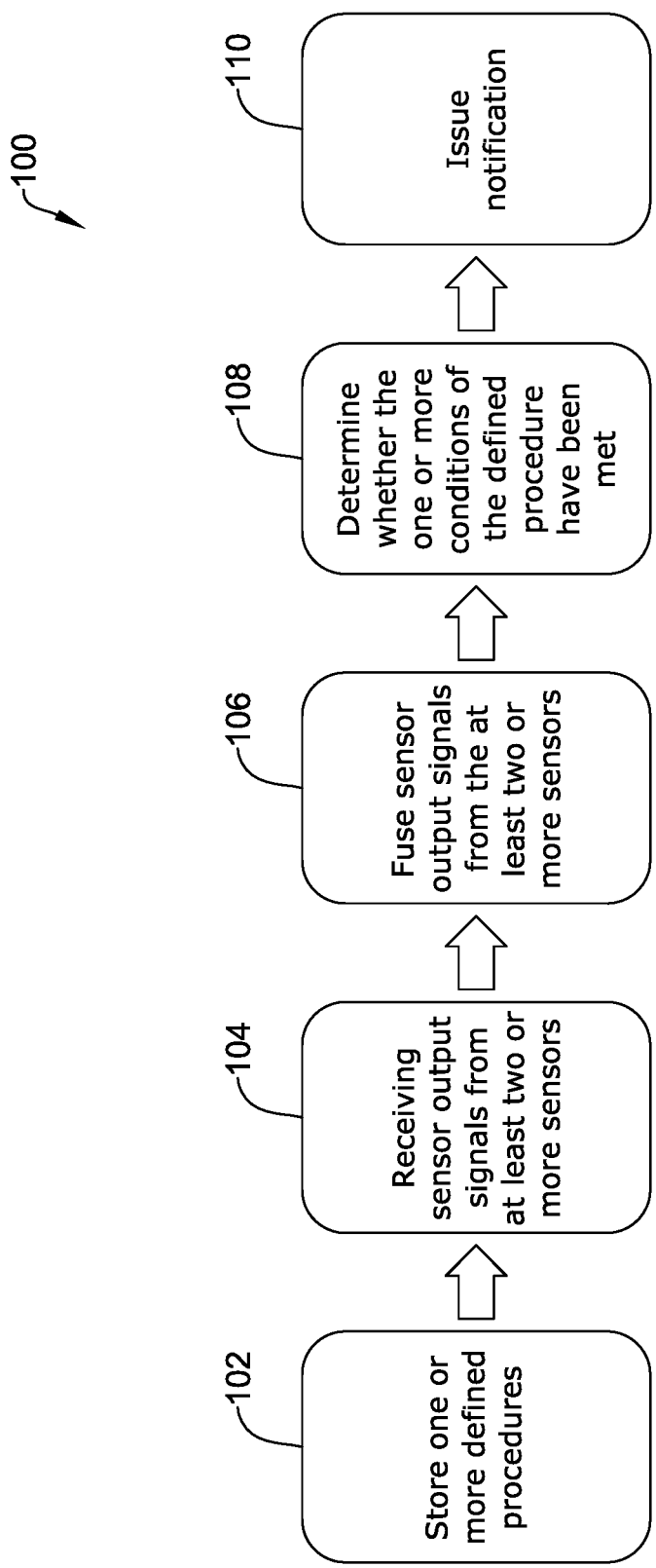
FIG. 2 is a flow chart of an illustrative method for monitoring procedural compliance of staff in a facility.

FIG. 2 is a flow chart of an illustrative method 100 for using the system 10 of FIG. 1 to monitor procedural (e.g., hand washing) compliance of staff in a facility. To begin, one or more defined procedures that are to be performed by a person in one or more rooms of the facility may be defined and stored in the memory 28, 36 of the hand-hygiene monitor 12 and/or computing device 14, as shown at block 102. It is contemplated that when the one or more defined procedures are stored in the memory 28 of the hand-hygiene monitor 12, the one or more defined procedures may be specific to the particular room in which the hand-hygiene monitor 12 is located. In other cases, all of the defined procedures, regardless of the room type to which they apply, may be stored in the same database (e.g., in the same memory). Each defined procedure may include predetermined criteria that must be met for the defined procedure or hand washing procedure to be considered correctly completed. In some cases, the predetermined criteria may include two or more distinct hand washing steps and/or a length of time a hand washing step should be performed.

For example, when washing hands, a person may be expected to wash their hands at a sink. Thus, in some cases, the criteria may include locating the person near the sink. The hand washing steps may include, but are not limited to:

1) approaching the hand washing station or sink;
2) turning on the water;
3) dispensing of soap (at the hand washing station or sink);
4) scrubbing of hands;
5) turning off the water;
6) drying of hands (e.g., through the use of a hand dryer, paper towels, etc.)
7) departing the hand washing station or sink.

It is contemplated that not all of the above steps are required to be performed for the user to be considered in compliance with the predetermined criteria. Further, additional steps may be required depending on the location of the hand-hygiene monitor 12. For example, an operating room may have more rigorous standards than a patient room. Some or all of the hand washing steps may include an associated length of time or minimum threshold time that the action should be performed. For example, a person may be required to scrub their hands for a minimum of 20 seconds or more to be considered as complying with the requirements of the scrubbing action or step. The predetermined criteria may be defined or programmed during commissioning of the hand-hygiene monitor 12 and/or computing device 14. In some cases, the predefined criteria may be updated or changed after commissioning. It is further contemplated that the some or all of the aspects of the predefined criteria may be learned using multi-factor machine learning or other machine learning technique. For example, the hand washing procedure may be performed one or more times while the system 10 is in a commissioning mode to allow the system 10 to recognize the vibrations, sounds, locations, and/or other signals that indicate a user is washing their hands in accordance with a set procedure. It is further contemplated that during commissioning and/or standard operation, the location of the person and/or the hand scrubbing motions may be verified using the radar 54. The predefined criteria may be updated periodically to incorporate any idiosyncrasies of the environment the hand-hygiene monitor 12 is operating in.

Once the defined procedures and/or predefined criteria have been stored, the system 10 may be used to monitor for procedural compliance. The system 10 (e.g., the processor 24 and or procedural compliance module 30 of the hand-hygiene monitor 12 and/or the processor 34 and/or procedural compliance module 38 of the computing device 14) may be configured to receive sensor output signals from at least two more sensors 16, as shown at block 104. The two or more sensors 16 may include an accelerometer 18 and a microphone 20, an accelerometer 18 and a radar, an microphone and a radar 54, etc. In some cases, one or more additional sensors, such as, but not limited to, a light sensor 44, a humidity sensor 46, a temperature sensor 48, a magnetometer 50, a motion detector 52, a radar 54, or a combination thereof, may be used in combination with, for example, the accelerometer 18 and/or the microphone 20. As described above, the sensor output signals may be unique and indicative of various actions being performed in the proximity of the sensors 16.

The system 10 (e.g., the processor 24 and or procedural compliance module 30 of the hand-hygiene monitor 12 and/or the processor 34 and/or procedural compliance module 38 of the computing device 14) may fuse or combine the sensor output signals from the at least two or more sensors 16, as shown at block 106. It is contemplated that fusing the sensor output signals may increase the confidence that a particular step or action is correctly identified. For example, the signals may be analyzed together to determine location, hand washing, and/or identity.

The system 10 may be configured to determine whether or not the one or more predefined criteria or conditions of the defined procedure have been met, as shown at block 108. The system 10 may be configured to compare a location of the person, an action or hand washing step performed by the person, a length of time the person has performed the action or step, to the one or more conditions of the defined procedures. This may include tracking the order of occurrence of the detected hand washing step.

Regardless of whether or not the person has met the one or more conditions of the defined procedure (e.g., location, action or step, and/or time), the system 10 may issue a notification or provide an alert, as shown at block 110. It is contemplated that the notification may be provided in real time so that the person has a chance to correct their mistake if the hand washing criteria were not met. In some cases, the alert may be provided directly to the user device 58 and/or the wearable device 56 of the person in the room. An illustrative alert may remind the user to perform the defined procedure (e.g., hand-hygiene). In other cases, an alert may be provided to a central location, such as, but not limited to, a nurses' station, supervisor, management, etc. In some cases, the room itself may have an alerting device, such as, but not limited to the compliance indicator 60 described herein, that can annunciate the alert to the person in the room.

In an illustrative example, an alert may be provided when a nurse or physician enters a patient room but fails to pause or stop at the hand sanitizing station or at the sink, fails to turn on the water, fails to dispense soap, etc. The alert may remind the user of the hand-hygiene procedure. It is contemplated that the alert may be a plain text alert (e.g., please wash your hands or please return to the hand sanitizer, etc.), a visual alert (e.g., an illuminated light), an audible alert (e.g., a beep or series of beeps), a haptic alert (e.g., a vibration of the wearable device 56 or the user device 58), etc.

Figure 3:
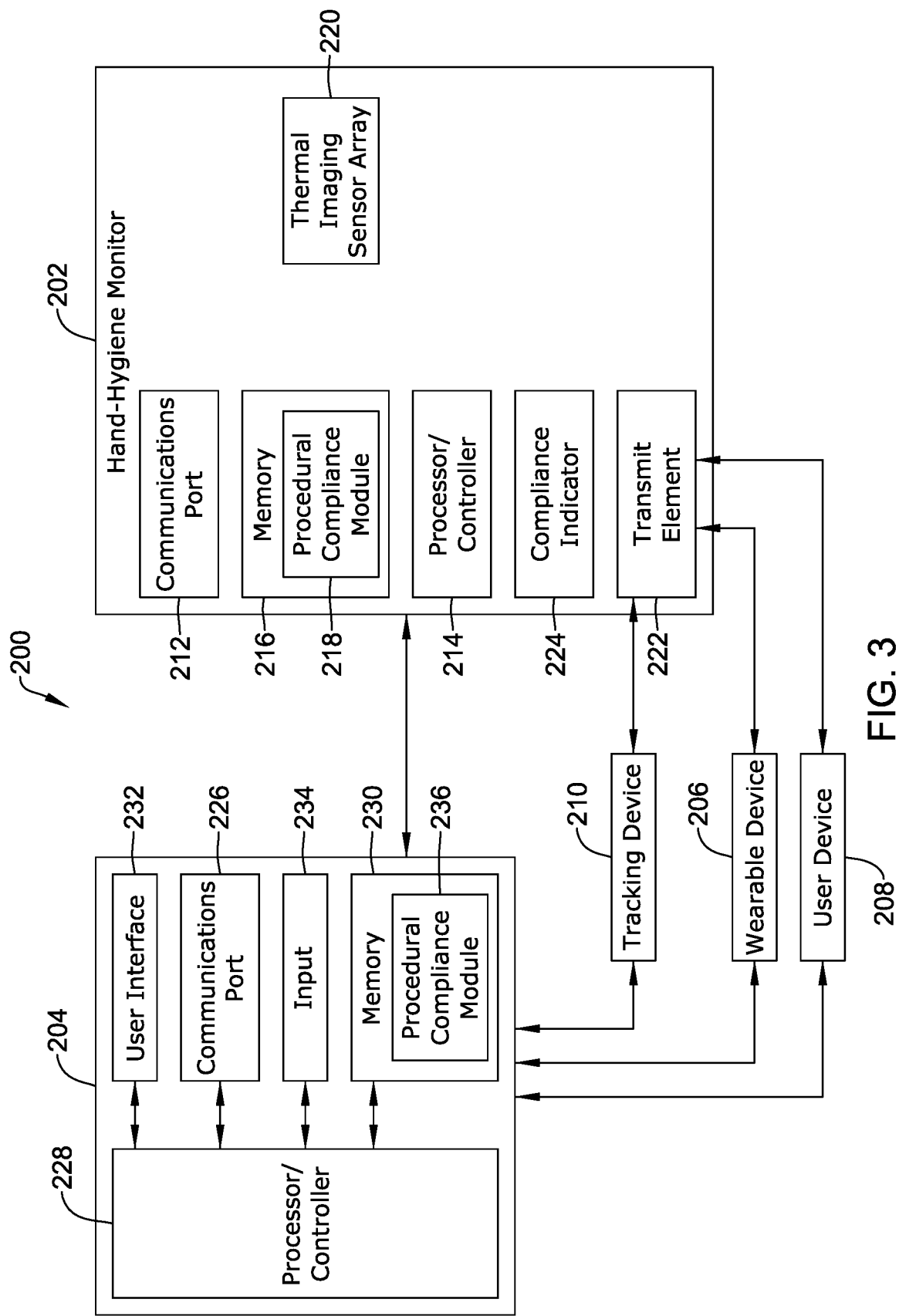
FIG. 3 is a schematic block diagram of an example hand-hygiene monitor that can be utilized according to one or more embodiments of the present disclosure.

FIG. 3 is a schematic block diagram of another illustrative system 200 for monitoring procedural (e.g., hand washing or hand-hygiene) compliance of staff in a hospital or other clinical setting. The system 200 may determine if a person has washed their hands at a hand washing station in compliance with one or more predetermined criteria. The determination may be made without the use of cameras which output a visually perceptible image of the hand washing station. For example, the system 200 may be configured to use an array of thermal imaging sensors that are minimally obtrusive to detect and alert hand-hygiene incidents. Generally, the system 200 may include a hand-hygiene monitor 202 and in some cases a computing device 204. In some cases, the information processing may be performed at the hand-hygiene monitor 202 and a separate computing device 204 may not be required. The system 200 may optionally include a wearable device 206 (e.g., a watch, a bracelet, a fitness tracker, an identification badge, etc.), a user device 208 (e.g., a cell phone, a tablet computer, etc.) carried by the person entering the room, and/or a tracking device 210. In some cases, the hand-hygiene monitor 202 may a separate system that is placed in a particular area (e.g., near a hand washing station).

The hand-hygiene monitor 202 may include a communications port 212 for operatively coupling to the computing device 204, the wearable device 206, the user device 208, and/or the tracking device 210. It is contemplated that the communications port 212 may be wired and/or wireless. When the communications port 212 is wireless, the communications port 212 may include a wireless transceiver, and the computing device 204, the wearable device 206, the user device 208, and/or the tracking device 210 may include a compatible wireless transceiver. It is contemplated that the wireless transceivers may communicate using a standard and/or a proprietary communication protocol. Suitable standard wireless protocols may include, for example, cellular communication, ZigBee, Bluetooth, WiFi, IrDA, dedicated short range communication (DSRC), EnOcean, or any other suitable wireless protocols, as desired.

The hand-hygiene monitor 202 may include one or more controllers or processors 214 that execute instructions stored in the system memory 216. In some cases, the controller 214 may include a programmable microprocessor. Such a programmable microprocessor may allow a user to modify the control logic of the hand-hygiene monitor 202 even after it is installed in the field (e.g., firmware update, application update). The system memory 216 of the hand-hygiene monitor 202 can include computer system readable media in the form of volatile memory, such as random access memory (RAM) and/or cache memory. The hand-hygiene monitor 202 may further include other removable/non-removable, volatile/non-volatile computer system storage media. By way of example only, the storage system can be provided for reading from and writing to a non-removable, non-volatile magnetic media (not shown and typically called a "hard drive" or flash memory). The system controller 214 and/or memory 216 may include at least one program/utility having a set of program modules that are configured to receive an input from or transmit an output to a remote computing device 204, a wearable device 206, a user device 208, and/or a tracking device 210.

In one example, the program/utility may be stored in the system memory 216 and may include one or more application program modules (e.g., software), such as a procedural compliance module 218. The procedural compliance module 218 may include one or more defined hand washing procedures that should be performed in a particular room of a facility in order to reduce the risk of infection. Each defined procedure may include one more predefined criteria, conditions, or actions that should be performed in order for the procedure to have been considered as performed correctly or to a standard, as will be described in more detail herein. It is contemplated that the defined procedure may be different for different types of rooms and/or a category type of the person entering the room. For example, the defined procedures for an operating room (OR) may be different than the defined procedures for a patient room. In some cases, the procedural compliance module 218 may be a part of the hand-hygiene monitor 202 or may be executed on the remote computing device 204, as will be described in more detail herein.

The hand-hygiene monitor 202 may include an array of thermal imaging sensors 220. In some instances, the array of thermal imaging sensors 220 may be used in combination with any or all of the sensors 16 of the system 10 described above. The array of thermal imaging sensors 220 may include a two-dimensional array of pixels which allow for a temperature detection of a two-dimensional area. It is contemplated that the array of thermal imaging sensors 220 may include four or more individually readable pixels arranged in two or more rows and two or more columns, and may be used to acquire a thermal image. In some cases, the array of thermal imaging sensors 220 may include a two dimensional array of passive infrared pixels. Example two dimensional arrays of passive infrared pixels include a 2×2 array, a 2×3 array, a 2×4 array, a 3×3 array, a 4×4 array, a 6×6 array, an 8×8 array, a 16×16 array, a 32×32 array, a 64×64 array, a 128×128 array, and/or any other suitable two dimensional array as desired. The array of thermal imaging sensors 220 may be an infrared array sensor based on advanced microelectromechanical systems (MEMS), such as, but not limited to the Infrared Array Sensor Grid-EYE manufactured Panasonic with a North American base in Secaucus, N.J.

Thermal images may be stored, at least temporarily, in the memory 216 of the hand-hygiene monitor 202. The resolution of the thermal image may be determined by the number of individually readable pixels of array of thermal imaging sensors 220. For example, an 8×8 array of individually readable pixels will result in 64 different temperature data points per frame acquired. The array of thermal imaging sensors 220 may have a relatively low resolution to allow it to be used in facilities where typical cameras are not allowed for privacy reasons. For example, the array of thermal imaging sensors 220 may not output a visually perceptible image of the hand washing station.

Figure 4:
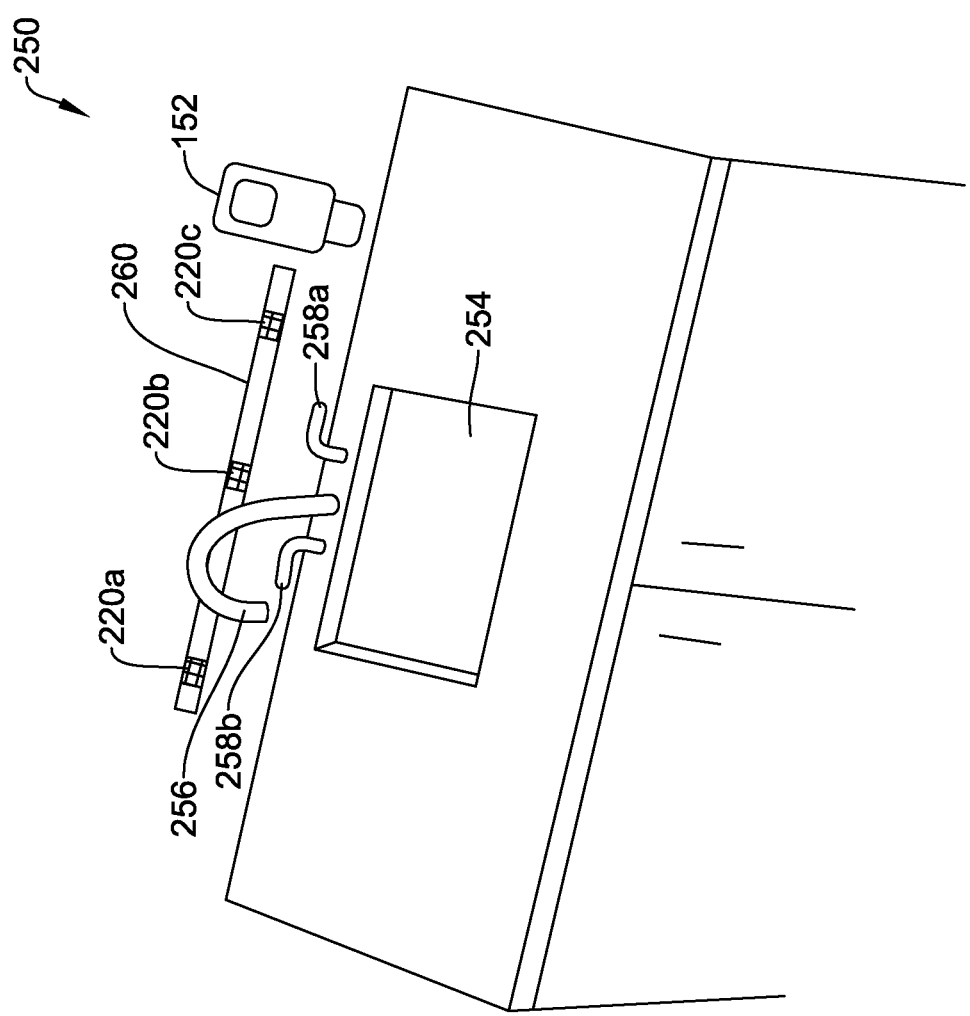
FIG. 4 is a schematic view of a hand washing station in a facility including an illustrative system for monitoring hand washing compliance of staff in a facility.

Referring additionally to FIG. 4, which is a perspective view of an illustrative hand washing station 250, the array of thermal imaging sensors 220 may be mounted, for example, to a wall, behind a faucet 256 and/or one or more faucet handles or levers 258a, 258b (collectively 258). In some cases, more than one array of thermal imaging sensors 220 may be provided. For example, the hand washing station 250 of FIG. 4 includes a first array of thermal imaging sensors 220a, a second array of thermal imaging sensors 220b, and a third array of thermal imaging sensors 220c (collectively, 220). While the hand washing station 250 is illustrated as include three array of thermal imaging sensors 220, the hand washing station 250 may include any number of array of thermal imaging sensors 220 desired, such as, but not limited to, one, two, three, four, or more. The array of thermal imaging sensors 220 may be positioned such that the field of view is focused on the water flow and/or the expected positioning of a person's hands while they are washing their hands. It is contemplated that when more than one array of thermal imaging sensors 220 is provided, the array of thermal imaging sensors 220 may be horizontally and/or vertically spaced to provide field of views from different angles of the region of interest. In the event that one of the array of thermal imaging sensors 220 is blocked or otherwise has the field of view obstructed, another of the array of thermal imaging sensors 220 may be positioned to capture a thermal image of the sink basin area 254. In some cases, the array of thermal imaging sensors 220 may be mounted to bar 260 or other mechanism to facilitate installation. In some embodiments, the array of thermal imaging sensors 220 may be battery powered. In other embodiments, the array of thermal imaging sensors 220 may be wired into a preexisting electrical system and/or plugged into an electrical outlet.

The hand washing station 250 may further include a soap dispenser 252. In some cases, the soap dispenser 252 may include an RFID reader which is configured to identify a user and/or verify the user was within proximity of the soap dispenser 252. The RFID reader may be configured to read an RFID tag associated with the user's identification badge or other user device 208 to determine the identity of the user. It is further contemplated that additional sensing methods may be used to determine the soap has been dispensed. For example, microphones may be used to listen for the sound of the soap being dispensed. This is just one example. Other sensing modalities may be used, as desired.

While not explicitly shown the array of thermal imaging sensors 220 may also be positioned adjacent to a waterless hand sanitizing station. In such a configuration, the array of thermal imaging sensors 220 may function in a similar manner to that described with respect to the hand washing station 250.

Returning to FIG. 3, the array of thermal imaging sensors 220 may be configured to detect water flow and/or and scrubbing movements. For example, the temperature of the water flowing from the faucet 256 may be different from the temperature of the background. Thus, the flow of water relative to the background can be identified. Further, a person's hands may also have a different temperature from the water and/or the background. The array of thermal imaging sensors 220 may be further configured to capture images at a predetermined frame rate which may allow the system 200 to determine if the hands are moving within the water flow. This may allow the controller 214 and/or procedural compliance module 218 to determine if water is running, whether or not hands are present and/or whether the hands are being moved in a scrubbing motion. It is further contemplated that the controller 214 and/or procedural compliance module 218 may be configured to measure a length of time each action occurs. For example, the controller 214 and/or procedural compliance module 218 may determine how long the faucet was running and/or how long the person was washing their hands based on the acquired thermal images. In some examples, a person could be deemed noncompliant with washing their hands if the person did not wash their hands for a particular period of time.

The controller 214 and/or procedural compliance module 218 may be configured to combine or fuse the sensor output signals from two or more sensors, if so provided. For example, sensors, such as, RFID readers/tags, radars, microphones, etc. may be used to increase the confidence the system has made the appropriate determination. The controller 214 and/or procedural compliance module 218 may then use the fused sensor signal outputs to determine whether the person has washed their hands at the hand washing station in compliance with one or more predetermined criteria or not. Alternatively, the controller 214 and/or procedural compliance module 218 may determine whether the person has washed their hands at the hand washing station in compliance with one or more predetermined criteria or not based on the thermal images. It is further contemplated that the controller 214 and/or procedural compliance module 218 may be configured to output a notification when the controller 214 and/or procedural compliance module 218 has determined that the person has washed their hands at the hand washing station in compliance with the one or more predetermined criteria.

The controller 214 and/or procedural compliance module 218 may be configured to analyze the thermal images and/or sensor data to determine if a sequence of events has occurred in a particular order. In one illustrative example, a sequence of events may include:
1) Soap dispensed;
2) Water flowing;
3) Hand scrubbing; and
4) Dwell time.

The preceding list of actions and/or steps of a handwashing procedure (compliant or otherwise) and/or the order thereof is not intended to be inclusive of all actions and/or steps that can be used to determine if a handwashing procedure is compliant or not, but rather indicative of some of the types of actions that can be recognized and used. For example, the sequence of events and/or dwell time can vary based on the type of hand-hygiene procedure.

The detection of one or more of these events can also be to determine whether a person is compliant with washing their hands. For example, if the array of thermal imaging sensors 220 detected water running but did not detect hand scrubbing, the data collected by the array of thermal imaging sensors 220 can suggest and the procedural compliance module 218 (or processor 214) can determine that a person did not wash their hands.

It is contemplated that combining the data from the array of thermal imaging sensors 220 with data from other sensors can increase the accuracy of the procedural compliance module 218 by providing the processor 214 and/or procedural compliance module 218 with more data to make a more informed decision on whether a person washed their hands. For example, in some embodiments, a moisture sensor and/or humidity sensor may be positioned in the wearable device 206 (e.g., a wrist worn device). The moisture sensor and/or humidity sensor may be configured to detect a change in moisture or humidity adjacent to the wearable device 206 that can be associated with wet hand (e.g., from washing hands). It is further contemplated that the location of the person (e.g., if the person has entered and/or exited the hand washing area) may be verified or determined by a radar.

In some embodiments a time period for one of these activities occur (e.g., a time duration of each action or step) can be compared to a threshold quantity of time appropriate for a specific activity to determine if a person may have been engaging in the activity and/or whether the amount of time was sufficient. For example, a thermal images which indicate scrubbing hands for twenty seconds could indicate that a person washed their hands for a sufficient period of time. Additionally, or alternatively, the length of time a person remains at the hand washing station 250, or dwell time, may be used.

described herein, sensors in addition to (or in place of) the array of thermal imaging sensors 220 may also be provided in the hand-hygiene monitor 202. For example, the hand-hygiene monitor 202 may include a light sensor, a humidity sensor, a temperature sensor, a magnetometer, a motion detector, a radar, or a combination thereof. Other sensors can provide additional data and/or increase the accuracy of the hand washing compliance data. The thermal images alone or in combination with additional sensors can be used to determine whether or not a person washed their hands and/or how long the person washed their hands.

The hand-hygiene monitor 202 may further include a transmit element 222. The transmit element 222 may be a transmitter or transceiver. For example, the transmit element 222 can be a radio frequency (RF) transceiver. In some examples, the transmit element 222 can be wired or wirelessly coupled to a processor and/or controller 214. The transmit element 222 can transmit data (e.g., images) detected and collected the array of thermal imaging sensors 220 of the hand-hygiene monitor 202. The transmit element 222 can transmit the data to the processor 214, to an external computing device 204, and/or to another device 206, 208, 210. In a number of embodiments, the processor 214 can be included in the hand-hygiene monitor 202. In some embodiments, the processor 214 can be configured to receive the data from the transmit element 222, as described above. The processor 214 and/or procedural compliance module 218 can use the data received from the transmit element 222 to determine whether a person washed their hands by analyzing the data detected and/or collected by the array of thermal imaging sensors 220 and/or other suitable sensors. In some examples, the processor 214 and/or procedural compliance module 218 can use a machine learning model to determine whether a person washed their hands.

For example, in one embodiment machine learning methods may be used (for example, a support vector machine) to detect the hand washing event through the array of thermal imaging sensors 220 and/or other sensors. In parallel, the point cloud from a radar may be used to deduce the position and identity of the personnel. The output of these two systems may then be fused to come to a conclusion (e.g., the person did or did not wash their hands). In other embodiments, the array of thermal imaging sensors 220 and radar data or both are input to a combined machine learning model that determines the presence, identity and hand washing all together. In yet another embodiment all three models above are created as an ensemble and run in parallel—the results from the three models are then fused and used to establish the predefined criteria. Finally, some embodiments may use different machine learning and artificial intelligence methods such as a support vector machine, deep neural networks, multi-way support vector machine etc. and create ensembles of these different models.

The hand-hygiene monitor 202 may further include a compliance indicator 224. Although the compliance indicator 224 is shown included in the hand-hygiene monitor 202, the compliance indicator 224 can be outside of the hand-hygiene monitor 202. For example, the compliance indicator 224 can be a separate device, built into a wearable device 206, built in to a user device 208, or a part of the computing device 204. The compliance indicator 224 can provide a visual and/or audible signal to a person to indicate whether the person has complied with, or is in compliance with, a hand washing procedure. Hand washing compliance can be tracked for a single hand washing activity or, in some embodiments, can be over a period of time, such as a period of hours, days, weeks, etc. The signal of the compliance indicator 224 can be, but is not limited to, a light, a symbol, a tone, or a combination thereof. The compliance indicator 224 may be similar in form and function to the compliance indicator 60 described above.

As described herein, the computing device 204 may be operatively coupled to the hand-hygiene monitor 202. The computing device 204 may be a system specific controller, a desktop computer, a laptop computer, a tablet, a cloud based computing device, a cloud server, etc. When the hand-hygiene monitor 202 is equipped with a processing device 214 and memory 216, the computing device 204 may not be required for the function of the system 200. When the computing device 204 is provided, the computing device 204 may be located in a same room as the hand-hygiene monitor 202, in a different room but a same building as the hand-hygiene monitor 202, or off-site (e.g., geographically different location) from the hand-hygiene monitor 202, as desired. The computing device 204 may include a communications port 226 (or receive element) for communicating with the hand-hygiene monitor 202 (or other devices, such as but not limited to, cell phones, wearable devices, etc.), the wearable device 206, the user device 208, and/or tracking device 210. In some cases, the computing device 204 may include more than one communications port 226 for communicating over more than one network (e.g., wireless LAN, wired LAN, the Internet, short range wireless communications, etc.). The communications port 226 may be a receiver or a transceiver. In some instances, the communications port 226 may be a radiofrequency (RF) transceiver.

The computing device 204 may further include a processor 228 (e.g. microprocessor, microcontroller, etc.) and a memory 230. The computing device 204 may also include a user interface 232. The user interface 232 may be a display or other means for allowing a user to interact with the computing device 204. The user interface 232 may be part of a personal computer, tablet computer, smart phone, laptop computer, or may include a standalone display. In some instances, the computing device 204 may include a user input 234 for receiving a user input from a user. For example, the user input may include a keyboard, mouse, actuatable buttons, or a touchscreen display. These are just examples.

The memory 230 may be used to store any desired information, such as the aforementioned procedural compliance module. The memory 230 may be any suitable type of storage device including, but not limited to, RAM, ROM, EPROM, flash memory, a hard drive, and/or the like. In some cases, the processor 228 may store information within the memory 230, and may subsequently retrieve the stored information from the memory 230. In some cases, the memory 230 may store one or more application program modules (e.g., software), such as a procedural compliance module 236. The procedural compliance module 236 may be the same as or different from the procedural compliance module 218 associated with the hand-hygiene monitor 202. The procedural compliance module 236 may include one or more defined procedures that should be performed in a particular room of a facility in order to reduce the risk of infection. Each defined procedure may include one more conditions or actions that should be met (sometimes in a specific order) in order for the procedure to have been considered as performed correctly or to a standard, as will be described in more detail herein. It is contemplated that the defined procedure may be different for different types of rooms and/or a category type of the person entering the room. In some cases, only one of the hand-hygiene monitor 202 or the computing device 204 is provided with a procedural compliance module 218, 236. In other cases, both the hand-hygiene monitor 202 and the computing device 204 are provided with a procedural compliance module 218, 236.

In some embodiments, a weighting value can be applied to one or more sensor data values if it is determined that a particular type of data is more predictive of a person having good hand-hygiene. For example, accelerometer data may be more reliable than microphone data and therefore a positive weighting value could be applied to one or more accelerometer data values or a negative weighting value could be applied to one or more microphone data values. This is just one example. Other weighting schemes may be used, as desired.

As discussed above, a machine learning model can be used by the processor 214 and/or procedural compliance module 218 of the hand-hygiene monitor 202 and/or the processor 228 and/or module 236 of the computing device 204 to determine whether a person was complaint in washing their hands. Data from the array of thermal imaging sensors 220 and/or data from other sensors can be input into the machine learning model to determine whether a person washed their hands. The machine learning model can be, but is not limited to, a support vector machine, a deep neural network, or a multi-way support vector machine, for example.

The processor 214 and/or procedural compliance module 218 of the hand-hygiene monitor 202 and/or the processor 228 and/or module 236 of the computing device 204 can use a machine learning model including statistical techniques to improve the accuracy of the system 200 over time. In some examples, machine learning and/or artificial intelligence can be used to perceive an environment, such as a bathroom, and adjust sensors and/or adjust a weighting value the processor 214 and/or procedural compliance module 218 of the hand-hygiene monitor 202 and/or the processor 228 and/or module 236 of the computing device 204 gives data from a particular sensor to improve probability of accurately determining whether a person complied with washing their hands.

The processor 214 and/or procedural compliance module 218 of the hand-hygiene monitor 202 and/or the processor 228 and/or module 236 of the computing device 204 can include an iterative learning component. The machine learning model can be updated periodically to incorporate idiosyncrasies of the environment that the hand-hygiene monitor 202 is in. In some examples, the machine learning model can be updated to suppress particular sounds, for example, the sound of doors opening and/or closing.

The processor 214 and/or procedural compliance module 218 of the hand-hygiene monitor 202 and/or the processor 228 and/or module 236 of the computing device 204 can save the processor executable instructions that provide the machine learning component in the respective memory 216, 230. The processor 214 and/or procedural compliance module 218 of the hand-hygiene monitor 202 and/or the processor 228 and/or module 236 of the computing device 204 can also save compliance data in the respective memory 216, 230. For example, the memory 216, 230 can include statistical data on people washing their hands, people washing their hands for a particular time, people washing their hands with soap, and/or a combination thereof.

The wearable device 206 may be device that is worn by or carried by a person (e.g., staff member). In some cases, the wearable device 206 may allow the system 200 to identify the staff member or a staff member type (e.g., physician, nurse, food service, etc.) when they enter a room. The identity of the staff member may then be used to determine which procedure the staff is expected to comply with when entering a particular room, if any. In some embodiments, the wearable device 206 may be used to identify the location of the person in the room. For example, the location of the person may be identified determining when the person is in proximity to another device in the room capable of receiving a signal transmitted by the wearable device 206.

In one example, the wearable device 206 may be a network or internet enabled bracelet or watch. It is contemplated that in addition to providing information regarding the staff, a bracelet may be equipped with gesture tracking technology and/or other sensors such as but not limited to humidity or moisture sensors. When so provided and worn on a wrist, a wearable device 206 may be used to provide additional information which may be used to determine if certain procedures are being followed (e.g., hand sanitizing, hand washing, etc.), as will be described in more detail herein. In other examples, the wearable device 206 may be an employee badge with a radiofrequency (RF) tag. It is contemplated that other wearable devices 206 may also be used, including, but not limited to, rings, necklaces, cell phones, etc. In some cases, the wearable device 206 may be include a wireless transceiver to wirelessly communicate with the hand-hygiene monitor 202, the computing device 204 and/or the user device 208. When so provided, it is contemplated that the wireless transceivers may communicate using a standard and/or a proprietary communication protocol. Suitable standard wireless protocols may include, for example, cellular communication, ZigBee, Bluetooth, WiFi, IrDA, dedicated short range communication (DSRC), EnOcean, or any other suitable wireless protocols, as desired. In some embodiments, the system 200 may not include a wearable device 206.

The user device 208 may be a device carried by a staff member as they are performing their duties. The user device 208 may include, but is not limited to, mobile devices including smart phones, tablet computers, laptop computers, wireless network-enabled key fobs, e-readers, and/or the like. The user device 208 may be configured to receive messages from the hand-hygiene monitor 202 and/or the computing device 204 regarding a procedure that is expected to be performed in a particular room. In some cases, the messages may be informing the staff of the procedural requirements. In other cases, the messages may be informing the staff they have failed to perform a procedure or performed it incorrectly, as will be described in more detail herein. In some embodiments, the system 200 may not include a user device 208.

The system 200 can include a tracking device 210. It is contemplated that the tracking device 210 may be a part of the wearable device 206 and/or the user device 208. For example, the tracking device 210 can be included in an identification card, for example. In other embodiments, the tracking device 210 may be a separate entity. For example, the tracking device 210 can be a vector or real-time location system (RTLS).

In some examples, the tracking device 210 can be used in combination with the data from the hand-hygiene monitor 202 to identify a person and whether or not they were in compliance with washing their hands. For example, the processor 214 and/or procedural compliance module 218 can match the hand-hygiene monitor 202 data at a particular time with a person in response to the tracking device 210 placing the person in front of the sink where the hand-hygiene monitor 202 is located at the particular time. The memory 216 can also include such tracking device 210 data.

Figure 5:
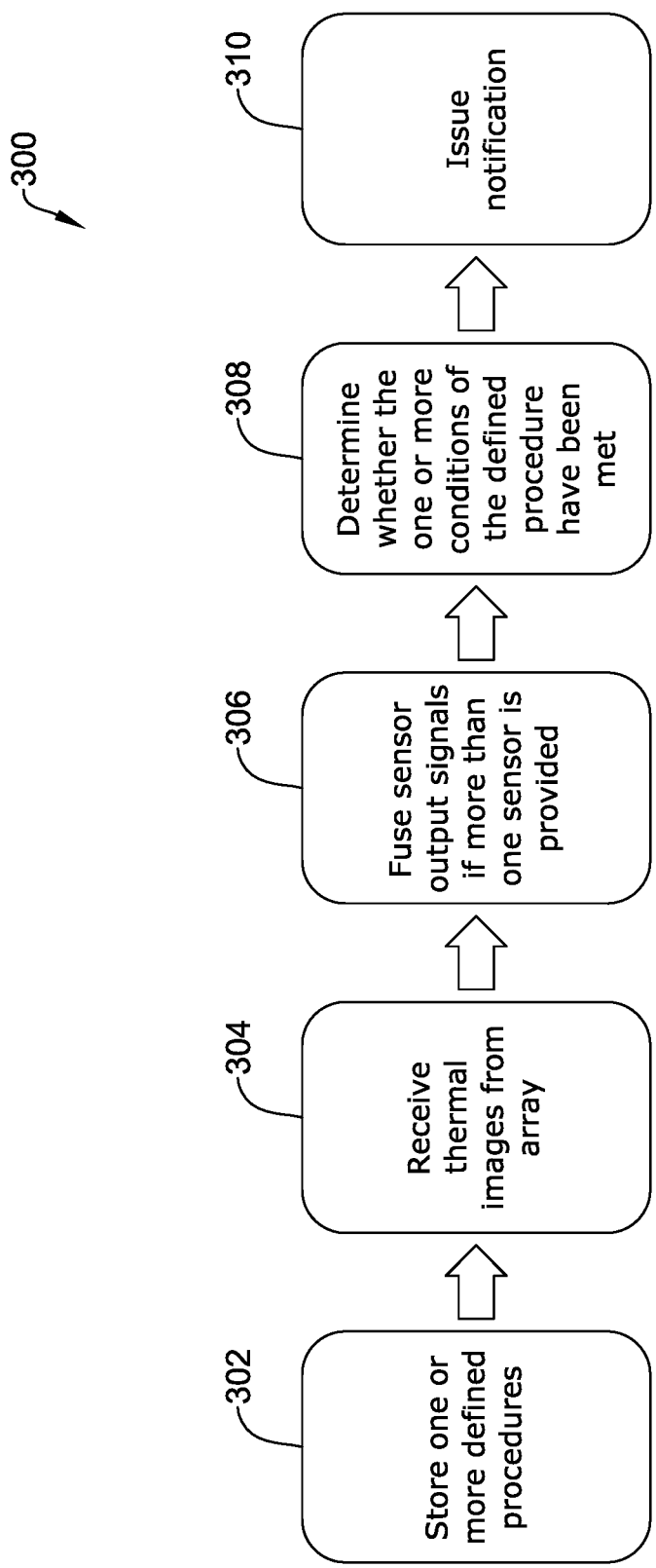
FIG. 5 is a flow chart of an illustrative method for monitoring procedural compliance of staff in a facility.

FIG. 5 is a flow chart of an illustrative method 300 for using the system 200 of FIG. 3 to monitor procedural (e.g., hand washing) compliance of staff in a facility. To begin, one or more defined procedures that are to be performed by a person in one or more rooms of the facility may be defined and stored in the memory 216, 230 of the hand-hygiene monitor 202 and/or computing device 204, as shown at block 302. It is contemplated that when the one or more defined procedures are stored in the memory 216 of the hand-hygiene monitor 202, the one or more defined procedures may be specific to the particular room in which the hand-hygiene monitor 202 is located. In other cases, all of the defined procedures, regardless of the room type to which they apply, may be stored in the same database (e.g., in the same memory). Each defined procedure may include predetermined criteria that must be met for the defined procedure or hand washing procedure to be considered correctly completed. In some cases, the predetermined criteria may include two or more distinct hand washing steps, an order in which the hand washing steps are to be performed and/or a length of time a hand washing step should be performed.

For example, when washing hands, a person may be expected to wash their hands at a sink. Thus, in some cases, the criteria may include locating the person near the sink. The hand washing steps may include, but are not limited to:

1) approaching the hand washing station or sink;
2) turning on the water;
3) dispensing of soap (at the hand washing station or sink);
4) scrubbing of hands;
5) turning off the water;
6) drying of hands (e.g., through the use of a hand dryer, paper towels, etc.)
7) departing the hand washing station or sink.

It is contemplated that not all of the above steps are required to be performed for the user to be considered in compliance with the predetermined criteria. Further, additional steps may be required depending on the location of the hand-hygiene monitor 202. For example, an operating room may have more rigorous standards than a patient room. Some or all of the hand washing steps may include an associated length of time or minimum threshold time that the action should be performed for. For example, a person may be required to scrub their hands for a minimum of 20 seconds or more to be considered as complying with the requirements of the scrubbing action or step. The predetermined criteria may be defined or programmed during commissioning of the hand-hygiene monitor 202 and/or computing device 204. In some cases, the predefined criteria may be updated or changed after commissioning. It is further contemplated that the some or all of the aspects of the predefined criteria may be learned using multi-factor machine learning or other machine learning technique. For example, the hand washing procedure may be performed one or more times while the system 200 is in a commissioning mode to allow the system 200 to recognize a thermal profile, locations, and/or other signals that indicate a user is washing their hands in accordance with a set procedure. It is further contemplated that during commissioning and/or standard operation, the location of the person and/or the hand scrubbing motions may be verified using a radar. The predefined criteria may be updated periodically to incorporate any idiosyncrasies of the environment the hand-hygiene monitor 202 is operating in.

Once the defined procedures and/or predefined criteria have been stored, the system 200 may be used to monitor for procedural compliance. The system 200 (e.g., the processor 214 and or procedural compliance module 218 of the hand-hygiene monitor 202 and/or the processor 228 and/or module 236 of the computing device 204) may be configured to receive thermal images from array of thermal imaging sensors 220, as shown at block 304. In some cases, the system 200 may receive data from one or more additional sensors, such as, but not limited, a radar, and RFID reader/tag, an accelerometer, a microphone, a light sensor 44, a humidity sensor 46, a temperature sensor 48, a magnetometer 50, a motion detector 52, or a combination thereof. As described above, the sensor output signals (e.g., thermal images) may be unique and indicative of various actions being performed in the proximity of the array of thermal imaging sensors 220.

The system 200 (e.g., the processor 214 and or procedural compliance module 218 of the hand-hygiene monitor 202 and/or the processor 228 and/or module 236 of the computing device 204) may fuse or combine the sensor output signals if two or more sensors output signals are received, as shown at block 306. It is contemplated that fusing the sensor output signals may increase the confidence that a step or action is correctly identified. For example, the signals may be analyzed together to determine location, hand washing, and/or identity. However, output signals from more than one sensor is not required.

The system 200 may be configured to determine whether or not the one or more predefined criteria or conditions of the defined procedure have been met, as shown at block 308. The system 200 may be configured to compare a location of the person, an action or hand washing step performed by the person, a length of time the person has performed the action or step, etc. to the one or more conditions of the defined procedures. Regardless of whether or not the person has met the one or more conditions of the defined procedure (e.g., location, action or step, and/or time), the system 200 may issue a notification or provide an alert, as shown at block 310. It is contemplated that the notification may be provided in real time so that the person has a chance to correct their mistake if the hand washing criteria were not met. In some cases, the alert may be provided directly to the user device 208 and/or the wearable device 206 of the person in the room. An illustrative alert may remind the user to perform the defined procedure (e.g., hand-hygiene). In other cases, an alert may be provided to a central location, such as, but not limited to, a nurses' station, supervisor, management, etc. In some cases, the room itself may have an alerting device, such as, but not limited to the compliance indicator 224 described herein, that can annunciate the alert to the person in the room.

In an illustrative example, an alert may be provided when a nurse or physician enters a patient room but fails to pause or stop at the hand sanitizing station or at the sink, fails to turn on the water, fails to dispense soap, etc. The alert may remind the user of the hand-hygiene procedure. It is contemplated that the alert may be a plain text alert (e.g., please wash your hands or please return to the hand sanitizer, etc.), a visual alert (e.g., an illuminated light), an audible alert (e.g., a beep or series of beeps), a haptic alert (e.g., a vibration of the wearable device 206 or the user device 208), etc.

EXAMPLES

In a first example, a hand-hygiene monitor may comprise an accelerometer to detect vibration within a first range, a microphone to detect sound within a second range, and a transmit element to transmit data detected by the accelerometer and the microphone.

Alternatively or additionally to any of the examples above, in another example, the hand-hygiene monitor may further comprise a light sensor to detect whether a light is on to determine whether a person is present.

Alternatively or additionally to any of the examples above, in another example, the hand-hygiene monitor may further comprise a radar to detect whether a person is standing within a particular proximity of a faucet.

Alternatively or additionally to any of the examples above, in another example, the hand-hygiene monitor may further comprise a humidity sensor to detect a humidity change to determine whether a faucet is running.

Alternatively or additionally to any of the examples above, in another example, the hand-hygiene monitor may further comprise a temperature sensor to detect a temperature change to determine whether a faucet is running.

Alternatively or additionally to any of the examples above, in another example, the hand-hygiene monitor may further comprise a motion detector to detect whether a person has entered an area.

Alternatively or additionally to any of the examples above, in another example, the hand-hygiene monitor may further comprise a magnetometer to detect a change in magnetic forces to determine whether a faucet is running.

Alternatively or additionally to any of the examples above, in another example, the hand-hygiene monitor may further comprise a processor to determine whether a person washed their hands by analyzing the data detected by the accelerometer and the microphone using a machine learning model.

Alternatively or additionally to any of the examples above, in another example, the hand-hygiene monitor may further comprise the hand-hygiene monitor is worn by a person.

In another example, a system for a hand-hygiene monitor may comprise a hand-hygiene monitor including an accelerometer to detect vibration within a first range, a microphone to detect sound within a second range, and a transmit element to transmit data detected by the accelerometer and the microphone. The system may further comprise a processor configured to receive the data from the transmit element and determine whether a person washed their hands by analyzing data from the accelerometer and the microphone using a machine learning model.

Alternatively or additionally to any of the examples above, in another example, data from one or more other sensors or data from a radar may be used by the processor to determine whether the person washed their hands.

Alternatively or additionally to any of the examples above, in another example, the processor may determine a sound of at least one of: a hand dryer blowing, the person drying their hands, a paper towel dispensing, soap dispensing, or a faucet running.

Alternatively or additionally to any of the examples above, in another example, an identity of the person may be determined using a tracking device.

Alternatively or additionally to any of the examples above, in another example, the tracking device may be a vector or real-time location system (RTLS).

Alternatively or additionally to any of the examples above, in another example, the tracking device may be included in an identification card.

Alternatively or additionally to any of the examples above, in another example, the processor may be included in a cloud server.

Alternatively or additionally to any of the examples above, in another example, the machine learning model may be a support vector machine, a deep neural network, or a multi-way support vector machine.

In another example, a system for a hand-hygiene monitor may comprise a hand-hygiene monitor including an accelerometer to detect vibration of a faucet, a microphone to detect sound of hand washing, and a radar to detect a presence of a person within a particular proximity of the faucet. The system may further comprise a processor configured to receive the data from the transmit element and determine whether the person washed their hands by analyzing data from the accelerometer, the microphone, and the radar.

Alternatively or additionally to any of the examples above, in another example, the radar may be a pulse-doppler radar.

Alternatively or additionally to any of the examples above, in another example, the radar may be a frequency-modulated continuous-wave radar.

Those skilled in the art will recognize that the present disclosure may be manifested in a variety of forms other than the specific embodiments described and contemplated herein. Accordingly, departure in form and detail may be made without departing from the scope and spirit of the present disclosure as described in the appended claims.

What is claimed is:

1. A system for monitoring compliance with a predetermined hand-hygiene procedure, comprising:
a plurality of sensors positioned adjacent a hand washing station, wherein each of the plurality of sensors is free from imaging pixels that form a visually perceptible image, each of the plurality of sensors is configured to provide a corresponding sensor output signal that is indicative of whether one or more predetermined actions associated with the predetermined hand-hygiene procedure has been performed or not;
a controller configured to fuse the sensor output signals from each of two or more of the plurality of sensors to produce a fused sensor output, and to determine using the fused sensor output whether at least one of the predetermined actions associated with the predetermined hand-hygiene procedure has been performed in compliance with one or more compliance criteria; and the controller further configured to output a notification when the controller has determined that one or more of the predetermined actions associated with the predetermined hand-hygiene procedure has not been performed in compliance with one or more corresponding compliance criteria and/or when the controller has determined that one or more of the predetermined actions associated with the predetermined hand-hygiene procedure has been performed in compliance with one or more corresponding compliance criteria.

2. The system of claim 1, wherein the predetermined hand-hygiene procedure includes a hand washing procedure and the one or more predetermined actions includes hand scrubbing for at least a dwell time.

3. The system of claim 2, wherein the one or more predetermined actions includes dispensing soap from a soap dispenser.

4. The system of claim 2, wherein the one or more predetermined actions includes having water flow at the hand washing station.

5. The system of claim 2, wherein the one or more predetermined actions includes hand drying.

6. The system of claim 1, wherein fusing the sensor output signals from each of two or more of the plurality of sensors comprises assigning different weights to at least two of the sensor output signals from each of two or more of the plurality of sensors.

7. The system of claim 6, wherein the different weights are assigned by a machine learning model.

8. The system of claim 1, wherein the controller is configured to obtain an identity of a person at the hand washing station, and to set one or more of the compliance criteria based at least in part on the identity of the person.

9. The system of claim 1, wherein the plurality of sensors comprise an accelerometer and/or a microphone.

10. The system of claim 1, wherein the plurality of sensors comprise a plurality of thermal imaging sensors.

11. The system of claim 1, wherein the plurality of sensors comprises one or more accelerometers and/or one or more microphones, and one or more of a light sensor, a radar sensor, a humidity sensor, a temperature sensor, a motion detector, and/or a magnetometer.

12. The system of claim 1, wherein the plurality of sensors comprise an accelerometer and a microphone, and wherein the controller fuses the sensor output signals from the accelerometer and the microphone to result in the fused sensor output.

13. The system of claim 1, wherein the plurality of sensors comprise a radar.

14. A method for monitoring hand-hygiene, the method comprising:
determining whether a person has performed a predetermined hand-hygiene procedure in compliance with one or more compliance criteria using two or more sensor outputs from two or more sensors, wherein each of the plurality of sensors is configured to provide a corresponding sensor output that is indicative of whether one or more actions associated with the predetermined hand-hygiene procedure has been performed;
fusing two or more of the sensor outputs from two or more of the sensors to produce a fused sensor output, and using the fused sensor output to determine whether the person has performed at least one of the actions associated with the predetermined hand-hygiene procedure in compliance with one or more of the compliance criteria; and
reporting whether the person has performed the predetermined hand-hygiene procedure in compliance with the one or more compliance criteria.

15. The method of claim 14, wherein the predetermined hand-hygiene procedure includes a plurality of actions, wherein the method further comprises:
determining whether each of the plurality of actions associated with the predetermined hand-hygiene procedure have been performed in compliance with one or more compliance criteria; and
reporting which of the plurality of actions associated with the predetermined hand-hygiene procedure have not been performed in compliance with one or more compliance criteria and/or which of the plurality of actions associated with the predetermined hand-hygiene procedure have been performed in compliance with one or more compliance criteria.

16. The method of claim 14, wherein the one or more actions associated with the predetermined hand-hygiene procedure comprises hand scrubbing for at least a dwell time.

17. The method of claim 14, wherein the one or more actions includes dispensing soap from a soap dispenser.

18. A method for monitoring hand-hygiene, the method comprising:
obtaining an identity of a person at a hand washing station;
setting one or more compliance criteria based at least in part on the identity of the person;
determining whether the person has performed a predetermined hand-hygiene procedure in compliance with the one or more compliance criteria set for the person using two or more sensor outputs from two or more sensors, wherein each of the plurality of sensors is configured to provide a corresponding sensor output that is indicative of whether one or more actions associated with the predetermined hand-hygiene procedure has been performed;
fusing two or more of the sensor outputs from two or more of the sensors to produce a fused sensor output, and using the fused sensor output to determine whether the person has performed at least one of the actions associated with the predetermined hand-hygiene procedure in compliance with one or more of the compliance criteria set for the person; and
reporting whether the person has performed the predetermined hand-hygiene procedure in compliance with the one or more compliance criteria.

19. The method of claim 18, wherein the predetermined hand-hygiene procedure includes a plurality of actions, wherein the method further comprises:
determining whether each of the plurality of actions associated with the predetermined hand-hygiene procedure have been performed by the person in compliance with one or more of the compliance criteria set for the person; and
reporting which of the plurality of actions associated with the predetermined hand-hygiene procedure have not been performed by the person in compliance with the one or more compliance criteria set for the person and/or which of the plurality of actions associated with the predetermined hand-hygiene procedure have been performed by the person in compliance with the one or more compliance criteria set for the person.

20. The method of claim 18, wherein the one or more actions associated with the predetermined hand-hygiene procedure comprises one or more of:
   hand scrubbing for at least a dwell time; and
   dispensing soap from a soap dispenser.

\* \* \* \* \*